United States Patent [19]

Lowmiller et al.

[11] Patent Number: 5,043,659
[45] Date of Patent: Aug. 27, 1991

[54] NON-INTRUSIVE TACHOMETER FOR SPARK IGNITION AUTOS

[75] Inventors: Donald A. Lowmiller; James D. Fraser; Neil W. Kunst, all of Tucson, Ariz.

[73] Assignee: Clean Air Technologies Inc., New York, N.Y.

[21] Appl. No.: 452,185

[22] Filed: Dec. 18, 1989

[51] Int. Cl.⁵ ............................................. G01P 3/48
[52] U.S. Cl. ..................................... 324/160; 324/402
[58] Field of Search ............................... 324/168–170, 324/166, 391, 390, 402

[56] References Cited

U.S. PATENT DOCUMENTS

| | | | |
|---|---|---|---|
| 3,601,773 | 8/1971 | Frieling | 324/170 |
| 3,793,583 | 2/1974 | Glomski et al. | 324/15 |
| 3,811,089 | 5/1974 | Strzelewicz | 324/170 |
| 3,886,450 | 5/1975 | Trussell et al. | 324/170 |
| 3,942,113 | 3/1976 | Wilson | 324/170 |
| 4,059,799 | 11/1977 | Faria | 324/402 X |
| 4,274,142 | 6/1981 | Furahashi et al. | 324/169 X |
| 4,296,471 | 10/1981 | Gout | 324/391 X |
| 4,536,708 | 8/1985 | Schneider | 324/402 X |
| 4,578,755 | 3/1986 | Quinn et al. | 324/391 X |
| 4,732,034 | 5/1988 | Bjorn | 73/2 |
| 4,777,435 | 10/1988 | Leplay et al. | 324/166 |
| 4,942,362 | 7/1990 | Lance | 324/402 |

FOREIGN PATENT DOCUMENTS 56-33556 4/1981 Japan .................................. 324/170

OTHER PUBLICATIONS

Benrey, "Build Your Own 'Wireless' Tach", *PS Electronics*, Mar. 1965, pp. 110–112.
Computer Controlled Handheld Digital Gasoline Engine Tachometer Model 501 DT-501, Catalog-501.
Non-Contact Tachometer (NCT) Systems Control.

*Primary Examiner*—Kenneth Wieder
*Assistant Examiner*—Warren S. Edmonds
*Attorney, Agent, or Firm*—Schweitzer, Cornman & Gross

[57] ABSTRACT

An non-intrusive tachometer for measuring engine RPM includes a hand-held probe having an antenna for sensing radio frequency electromagnetic signals radiated from an operative spark ignition engine. The probe includes means for providing a pulse signal indicative of plug firing events to signal processing means which executes a statistical algorithm to determine the time between spark plug firings and engine RPM. A visual display displays engine RPM. Automatic gain contol means provides the pulse signal with a relatively constant amplitude by compensating for the inherently wide variation in amplitude of the electromagnetic signals among different automobile ignition systems. The signal processing means and display are located separate from the probe in an emissions testing system, or the signal processing means and display are integrated within the probe.

39 Claims, 15 Drawing Sheets

NON-INTRUSIVE TACHOMETER FOR SPARK IGNITION AUTOS

DESCRIPTION

1. Technical Field

This invention relates to tachometers, and more particularly to a non-intrusive tachometer for spark ignition automobiles.

2. Background Art

Automotive test equipment for inspecting vehicle emission levels must measure engine speed. In the prior art, it is known to use either contacting or non-contacting tachometers (tachs). Contacting tachs require a physical connection of a probe to, e.g., a spark plug wire. Non-contacting tachs may either sense a radiated electromagnetic field, an electrostatic field, or may operate on acoustic principles.

Exemplary prior art non-contacting tachs are typically hand-held, complete devices wherein engine RPM is sensed and indicated in a single device. An example is the Model DT-501 provided by Shimpo, which appears to detect rapidly changing electric fields in the vicinity of the ignition coil secondary wiring. However, for use with vehicle emissions testers, the Shimpo device requires the operator to measure engine RPM and then walk over and manually enter the RPM in the tester. The time wasted in doing so is undersirable.

Regarding contacting tachs, newer engine types being developed do not provide easy access to ignition system components to which these induction pickup-type tachs can be connected. An example of a newer engine type is the Quad Four from General Motors, which includes a wireless ignition system completely enclosed in metal. Contacting tachs cannot be used in this case since there is no location to connect the tach to.

The non-contacting tachs which sense electrostatic fields have also been found to be either inaccurate or non-functional with wireless ignition type since the metal case acts as an effective shield to the electric fields within the engine. Similarly, non-contacting tachs are inaccurate or non-functional with engines having multiple spark plug firings per engine revolution and rotary engines which effectively change the number of spark plug firings per revolution based on engine speed. This is due, in part, to the level of ability of the signal processing means within the tach to discriminate a valid spark plug firing signal from noise (i.e., multiple plug firings).

Prior art non-contacting tachs that sense electromagnetic fields typically sense fields in a frequency range of from 5 kilohertz (KHz) to 30 KHz. See, e.g., U.S. Pat. No. 3,886,450 to Trussell et al. and U.S. Pat. No. 3,811,089 to Strzelewicz. However, the antenna used for sensing these low frequency fields is necessarily large and somewhat cumbersome. Also, these frequencies are substantially attenuated a short distance away from the source. This requires a placement of the tach in close proximity to the ignition system in order to accurately capture the radiated signal.

DISCLOSURE OF INVENTION

Objects of the present invention include the provision of a non-intrusive (non-contacting) tachometer responsive to electromagnetic fields in the radio frequency range so as to reduce the size of the sensing antenna and increase the distance from the vehicle ignition from which an accurate measurement of RPM can be made.

Further objects include the provision of a non-intrusive tachometer which allows measurement of engine RPM on a broad range of vehicles having varying engine types, including the newer engine types which may be inaccessible to contacting tachometers.

Still further objects include the provision of a non-intrusive tachometer which incorporates an automatic gain control circuit to compensate for variations in electromagnetic signal strength among different ignition systems, and the provision of visual feedback to help the operator to position the tachometer probe for optimum performance.

This invention is predicated on the fact that although vehicle ignition systems radiate electromagentic energy in a broad band of frequencies, including audio frequencies, a good portion of the electromagnetic energy corresponding to spark plug firing events is concentrated in the range of from 1 megahertz (MHz) to 10 MHz.

According to the present invention, a non-intrusive tachometer for measuring vehicle engine speed includes a hand-held probe having an antenna for sensing electromagnetic signals in a portion of the radio frequency range that are radiated from an operative spark ignition internal combustion engine and for providing sensed electronic signals indicative thereof, the electromagnetic signals being indicative of changing current in the ignition circuit, the changing current being indicative, inter alia, of spark plug firing events; the probe further includes signal processing means responsive to the sensed electronic signals for providing a pulse signal indicative of spark plug firing events, the pulse signal being fed to digital signal processing means for executing a statistical algorithm which determines the time between spark plug firings and engine RPM and provides an engine RPM signal to display means for visually displaying engine RPM.

In further accord with the present invention, the probe signal processing means further includes automatic gain control means for providing the pulse signal with a relatively constant amplitude by compensating for the inherently wide variation in amplitude of the electromagnetic signals among different automobile ignition systems.

According to a second aspect of the present invention, the digital signal processing means is located separate from the probe and in a computer-based vehicle emissions testing system, the probe signal processing means feeding the pulse signal to the digital signal processing means over a cable connection therewith. In further accord with this aspect of the present invention, the emissions testing system includes a video monitor for visual display of vehicle emissions testing data together with engine RPM as calculated by the digital signal processing means. In still further accord with this aspect of the present invention, the display means provides a visual indication of the signal strength of the electromagnetic signals so as to aid the operator in the optimum location of the probe in proximity to the vehicle ignition system.

According to a third aspect of the present invention, the digital signal processing means and visual display means are integrated within the probe, thereby making the probe a complete and independent device.

The present invention provides, for the first time, a non-intrusive tachometer for providing an accurate indication of RPM when used with a wide variety of vehicle ignition systems, including those recently developed to which traditional contacting-type tachometers cannot be easily connected.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 2:
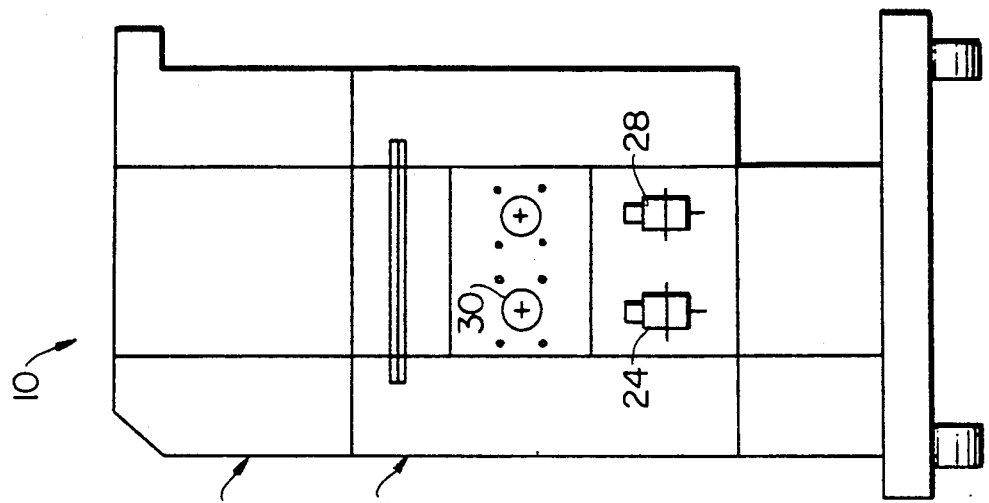
FIGS. 1 and 2 are front and side perspective views, respectively, of a vehicle emissions testing system in which a portion of a preferred embodiment of the present invention may be implemented in accordance with a second aspect of the present invention.
Figure 1:
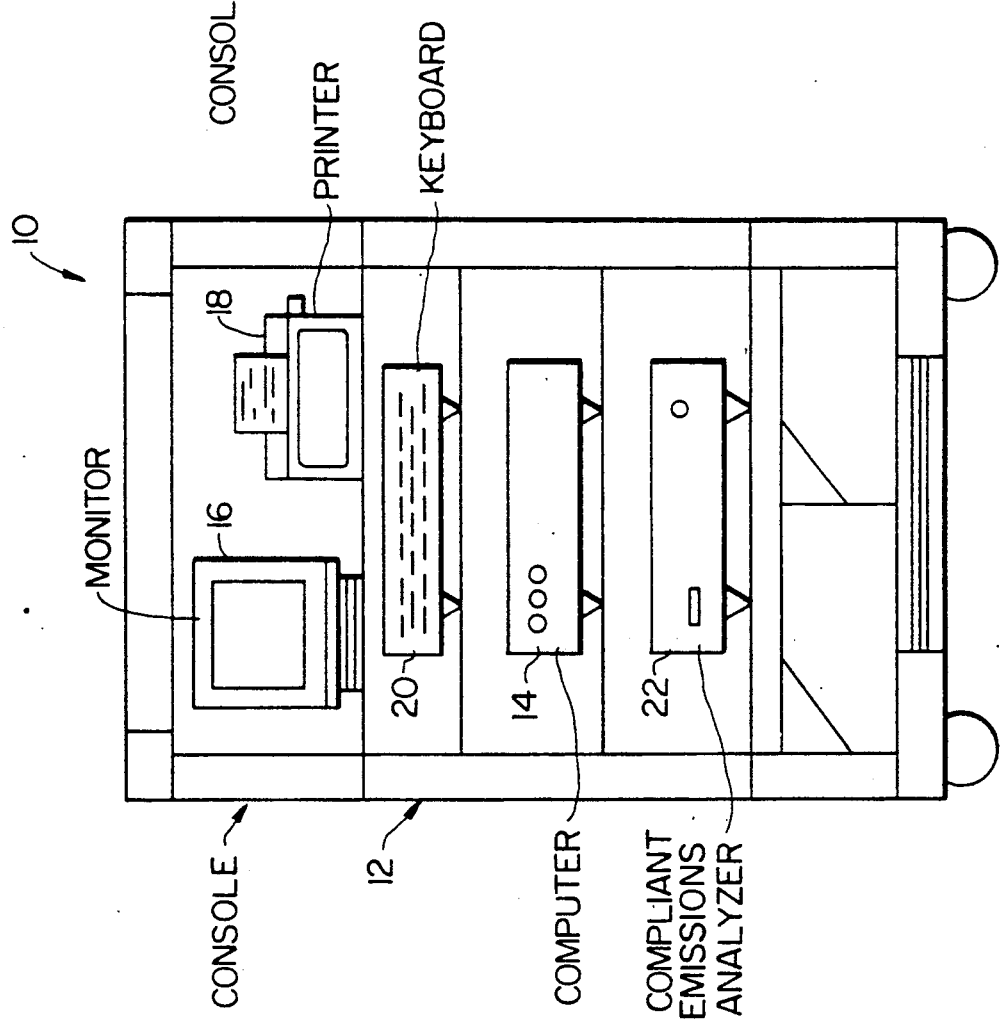

Referring to FIGS. 1 and 2, a portion of a preferred embodiment of the present invention may be implemented in computer-based, automotive emissions test equipment 10 (e.g., the BAR90 Emissions Unit from Hamilton Test Systems) which provides for automated testing of vehicle emissions. FIGS. 1 and 2 illustrate front and left side views, respectively, of the emissions equipment 10. The equipment includes a transportable console 12 housing a customer interface unit (CIU) computer 14, video monitor 16, printer 18, keyboard 20, and a computerized BAR-84/BAR-90 compliant emissions analyzer (CEA) 22 having exhaust probe 24 and engine RPM probe 26 (not shown). Included with the CEA 22 is a gas analyzer and filter assembly 28. Also illustrated is a connector 30 on the side of the console 12 which connects the RPM probe 26 thereto.

Figure 3:
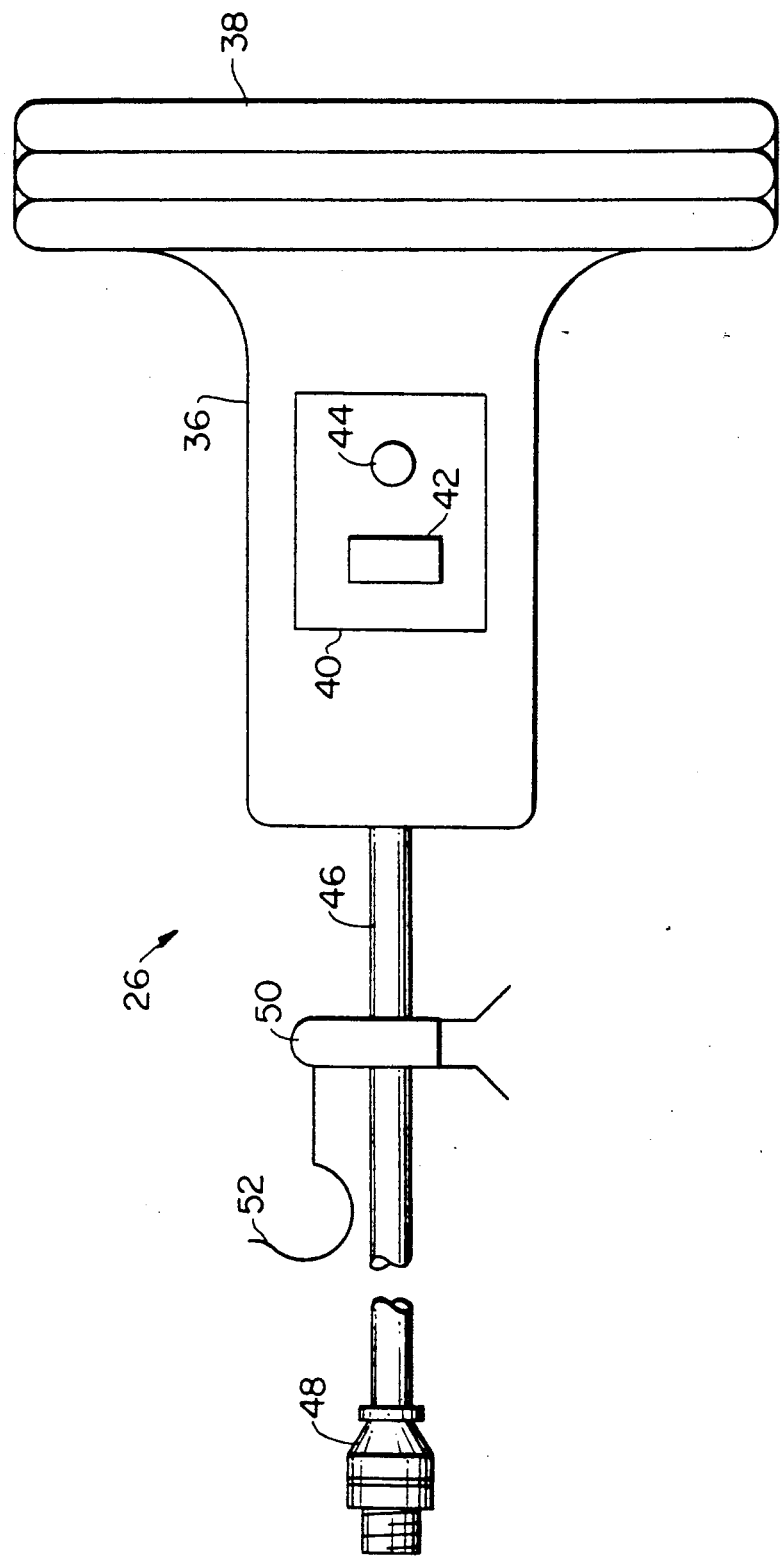
FIG. 3 is a perspective diagram of a tachometer probe which may interface with the testing system of FIGS. 1, 2.

FIG. 3 illustrates the RPM probe 26 of the present invention as comprising a plastic or other non-metallic housing 36 shaped for hand-held use. One end of the housing contains a ferrite rod antenna 38 which rests in a polymer foam pad (not shown) inside the housing 36 so as to prevent the antenna 38 from breaking if dropped on a hard surface. A polymer label 40 is attached to the top surface of the housing. The label has embedded in it a restart switch 42 and an indicator LED 44. A small sheet of soft polymer material (not shown) is attached to the underside of the housing and acts as a nonslip protector pad which enables the operator to rest the housing 36 on a flat surface, such as an engine valve cover or vehicle fender, without damaging the automobile surface finish.

A cable 46 electrically connects the RPM probe 26 to the console 12 by means of a connector 48 which mates with the corresponding console connector 30. A clip 50, which may slide along the cable 46, attaches to a hook 52 on the cable. The hook 52 is used to hang the RPM probe from a convenient location such as the underside of the vehicle hood.

The antenna 38 is sensitive to magnetic fields caused by current flowing in a closed path. By embedding the LED 44 in the polymer label 40, the area of the current loop can be reduced, thereby reducing the probability of current pulses in the LED being sensed as spark plug firings.

Figure 4:
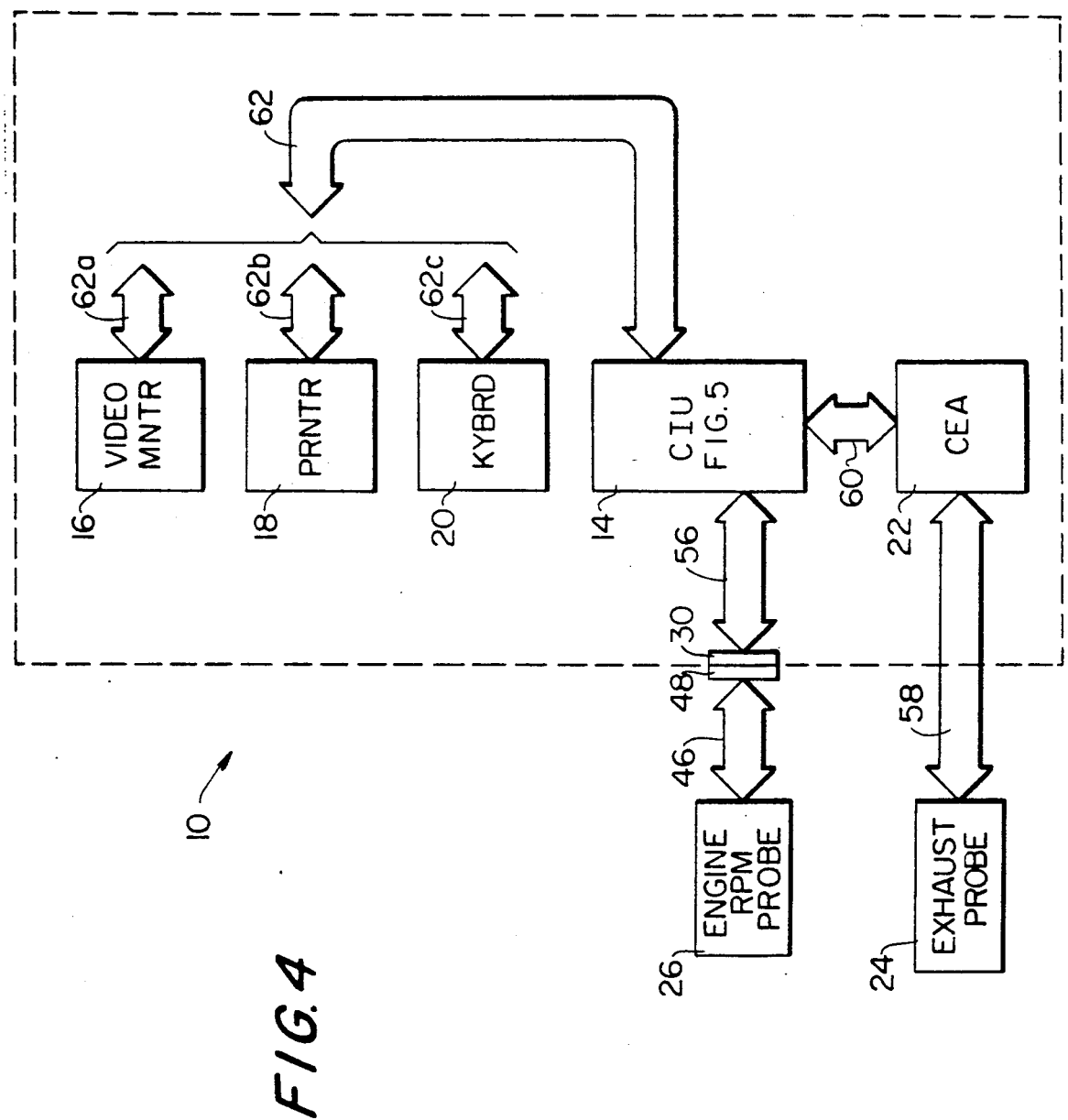
FIG. 4 is a block diagram of the testing system of FIGS. 1, 2 with the probe of FIG. 3.

FIG. 4 is a block diagram of the emissions equipment 10. The RPM probe 26 communicates with the CIU 14 by way of the probe cable 46 and connector 48, console connector 30, and signal lines 56. RPM probe/CIU communications is described in detail hereinafter. The sensed exhaust gases from the exhaust probe 24 pass through a hose 58 to the CEA 22. The CEA-processed signals are then presented to the CIU 14 on a communications link 60, e.g., an RS232 serial data link. The CIU directs the operation of the monitor 16, printer 18, and keyboard 20 through signal lines 62 (monitor lines 62a, keyboard lines 62b, and printer lines 62c). Communication with each device 16-20 is in conformance with the appropriate industry standard for that particular type of device.

Figure 5:
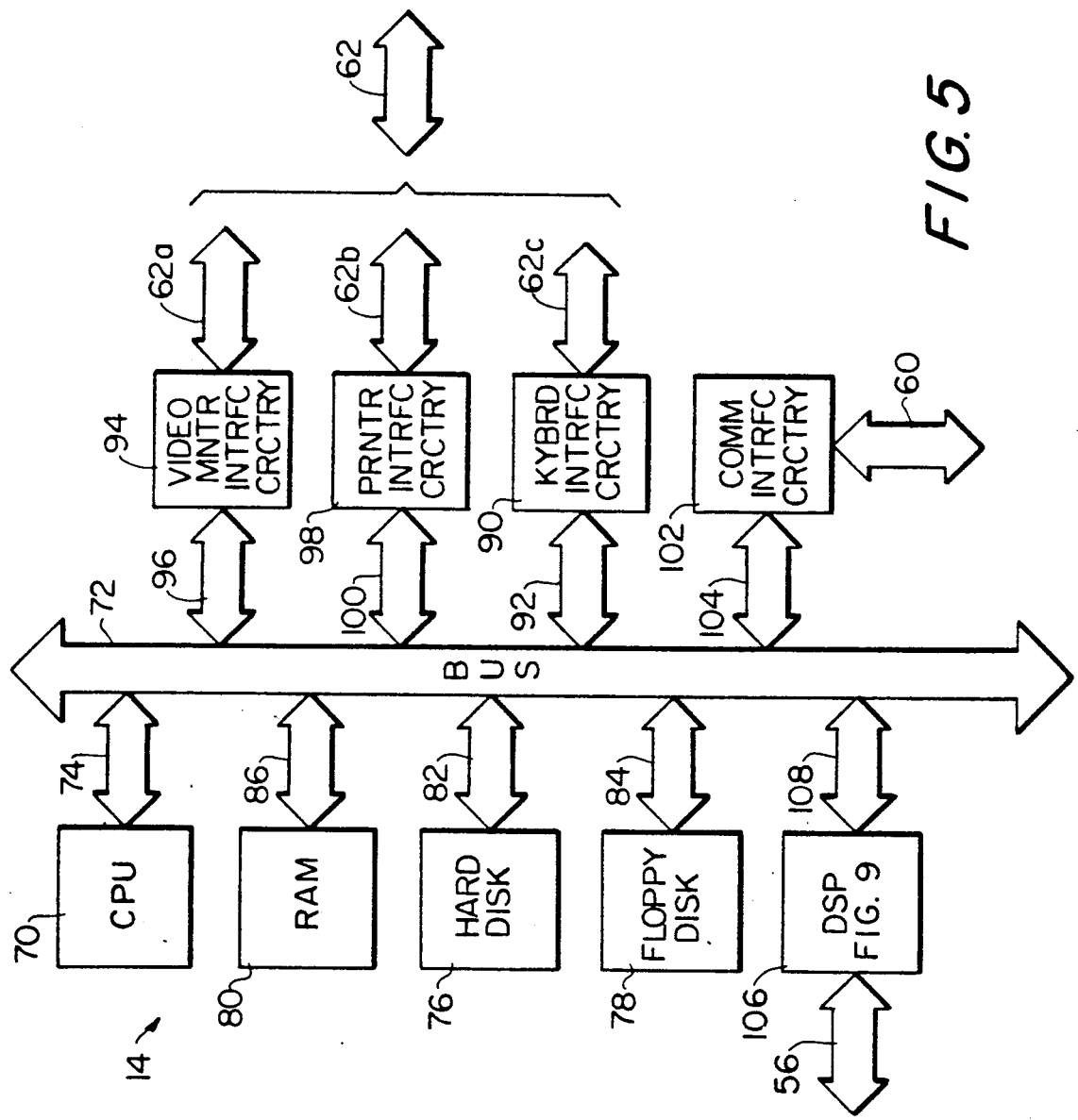
FIG. 5 is a block diagram of selected elements of the testing system of FIGS. 1, 2.

Referring to FIG. 5, the CIU 14 comprises, e.g., an International Business Machines (IBM) Corporation Model AT computer. The CIU contains the hardware and software necessary to interface with all elements of the equipment 10. The CIU includes a central processing unit (CPU) 70 connected to a CIU bus 72 by signal lines 74. The CIU bus includes address, data and control lines.

The CIU provides data storage devices, including a hard disk drive 76, one or more floppy disk drives 78, and random access memory (RAM) 80. The hard disk 76, typically 40 megabyte (MB) capacity, stores the software operating system (e.g., MS-DOS) and the emissions test software. The hard disk connects to the CIU bus 72 by signal lines 82. The floppy disk 78 comprises the known 3.5 inch, 1.44 MB format and connects to the CIU bus 72 by signal lines 84. The RAM 80 stores program operating parameters and comprises integrated circuit (IC) components totalling 640 kilobytes (KB) or more of memory capacity. The RAM connects to the CIU bus by signal lines 86.

The keyboard 20 is the main operator input device to the CIU and provides a full alphanumeric character set. The CIU includes keyboard interface circuitry 90 connected to the CIU bus by signal lines 92. The monitor 16, e.g., a VGA color display monitor, displays test procedures and results. The CIU includes monitor interface circuitry 94 connected to the CIU bus by signal lines 96. The printer 18, e.g., a Model LQ-850 dot matrix printer from Epson Corp., prints test data and results. The CIU includes printer interface circuitry 98 connected to the CIU bus by signal lines 100.

The CIU 14 includes known communications interface circuitry 102 which implements the CEA link 60 and connects to the CIU bus by signal lines 104. Also, the CIU includes digital signal processor (DSP) circuitry 106, described in detail hereinafter with respect to FIG. 9, which interfaces with the RPM probe 26 over the signal lines 56 and processes the probe signal to produce a signal indicative of engine RPM. The DSP circuitry 106 connects to the CIU bus by signal lines 108.

Figure 6:
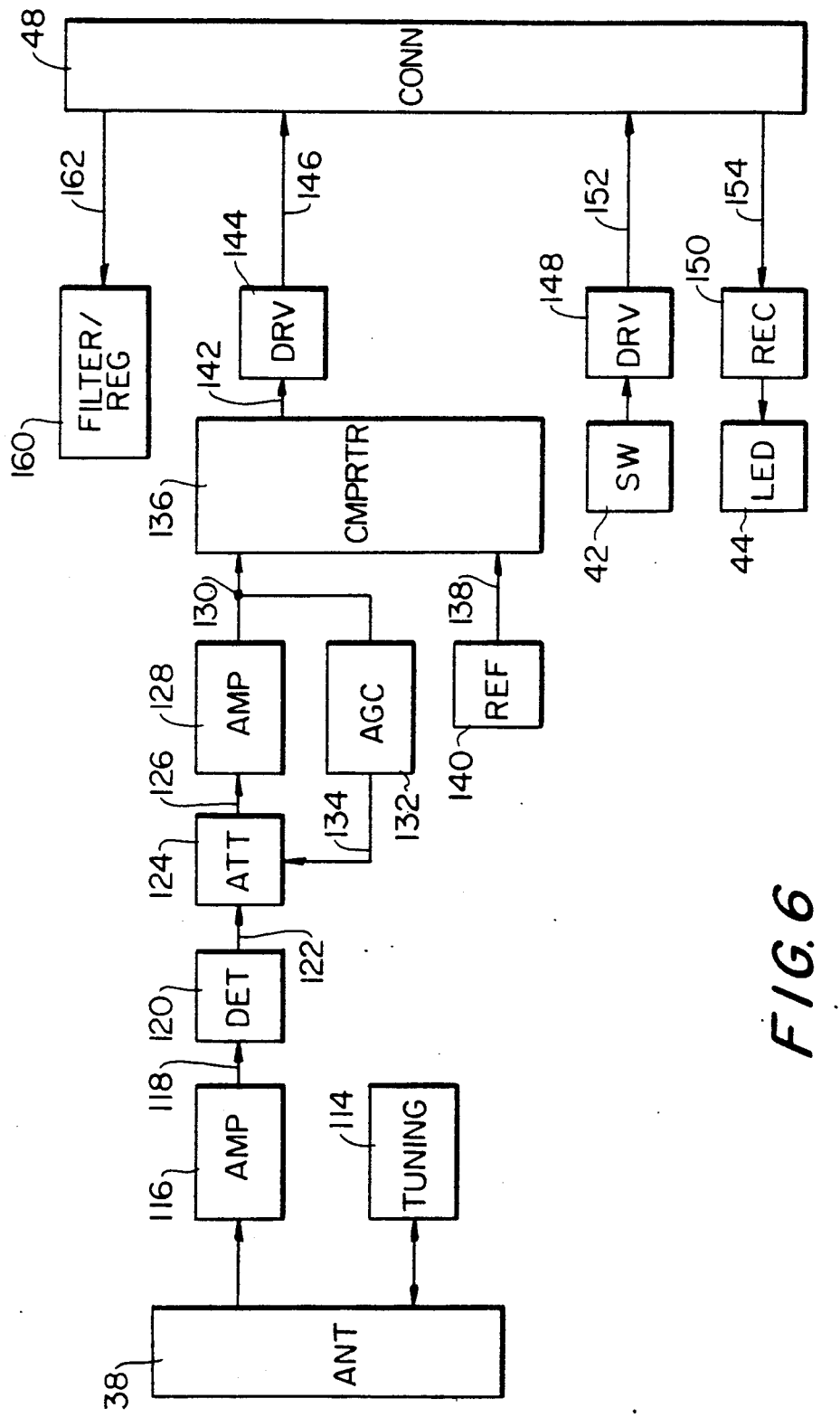
FIG. 6 is a block diagram of selected elements of the probe of FIG. 3.

FIG. 6 is a block diagram of the electronics in the RPM probe 26. The electromagnetic energy emanating from an operative vehicle spark ignition system is fairly broad band in frequency. However, a good portion of the energy associated with spark plug firings is contained in a frequency range from approximately 1 to 10 megahertz (MHz). The ferrite rod antenna 38 has two windings 110,112 and is tuned to receive magnetic field waves in the 2 to 10 MHz range. The antenna is tuned by means of a tuning circuit 114 shunting one coil winding 112 of the antenna The other coil winding 110 is connected to differential inputs of a radio frequency amplifier (RF amp) 116 which has approximately 20 dB of voltage gain. The overall bandwidth of the RF amp 116 is approximately 2 MHz centered at 4 MHz. Tuning the antenna helps to eliminate a substantial portion of the radio interference from the AM radio broadcast band, which ends at 1.8 MHz.

The output of the RF amp on a line 118 feeds into a diode detector 120 which produces output pulses corresponding to bursts of magnetic field energy caused by electric events in the engine. Some of these events may not be spark plug firings. Many engines have electronic fuel injection systems which generate magnetic field pulses nearly the same amplitude as those generated by spark plug firings. These fuel injection pulses may or may not be in phase with the spark plug firings.

The output of the detector 120 on a line 122 is connected to a shunt attenuator 124. The shunt attenuator attenuates the detector output and feeds it on a line 126 to an audio amplifier 128. The output of the audio amp on a line 130 is fed to an automatic gain control (AGC) circuit 132. In turn, the AGC output on a line 134 is fed to the shunt attenuator 124 and is used to control the amount of attenuation of the detector output signal In this way, the AGC and shunt attenuator keep the amplitude of the output of the audio amp 128 on the line 130 at a relatively constant value for detector output signals having varying amplitudes. Overall, the gain of the audio amp ranges from about −3 dB to +37 dB with a bandwidth of approximately 20 kilohertz (KHz).

The varying amplitude range of electromagnetic signals is due to different engine types. Many newer engines (e.g., the GM "Quad 4") produce very little electromagnetic signal strength, thus requiring the full +37 dB gain of the audio amp. Other engines, e.g., the metal wire type ignition systems, generate a large signal amplitude such that the audio amp would be saturated nearly continuously if it had a fixed +37 dB gain.

Following the audio amp is a voltage comparator 136 with a voltage on a line 138 from a reference source 140 feeding one input of the comparator 136 and the audio amp output on the line 130 feeding the other input. The comparator eliminates pulses from the audio amp which fall below approximately 90% of the full scale output of the audio amp. Most pulses that fall below this threshold are noise, although some may be valid spark plug firing signals The comparator output on a line 142 is a pulsed signal, each pulse ideally being indicative of a spark plug firing. However, in reality, a pulse may represent an electrical engine event other than a valid plug firing. The statistical algorithm executed by the digital signal processor circuitry 106, as described hereinafter with respect to FIGS. 10a, 10b, 10c, and 11, can compensate for random missing pulses as well as discriminate between valid plug firings and noise.

The comparator output is fed to a differential line driver 144 having a rise time limiter which helps to reduce noise that could be coupled from the output of the driver 144 on a signal line 146 to a power line 162 in cable 46. That noise, were it not thus controlled, could couple into the RF amp 116 and be detected as engine electrical events. The output of the driver 144 is passed on the line 146 within the RPM probe cable 46 to the connector 48.

Two other auxiliary functions are present in the RPM probe 26. The LED 44, under direct control of the DSP circuitry 106, is flashed to indicate that an intelligible signal is received by the DSP circuitry from the probe. The LED may be flashed at a rate indicative of the signal strength of the sensed electromagnetic signals Also, the restart switch 42 is provided so that the operator may conveniently reset the operation of the tachometer. The closure of the restart switch is read by the DSP circuitry, as described hereinafter. The restart switch and LED interface to the connector 48 by suitable known interface circuitry 148,150 over signal lines 152,154, respectively. The signal lines 152,154 are a part of the cable 46.

The RPM probe 26 receives its power (i.e., DC voltage) from the DSP circuitry 106 over signal lines 162 which are a part of the cable 46. Radio frequency interference (RFI) filters and regulators 160 in the RPM probe attenuate frequencies above 1 MHz. This reduces the possibility of false spark plug firings being interpreted by the RPM probe since even very small currents in the 2-6 MHz band may be detected as plug firings when the AGC gain is at its maximum of +37 dB. The output of the regulators 160 supplies the various DC voltages required by the electronic components in the RPM probe.

Figure 7:
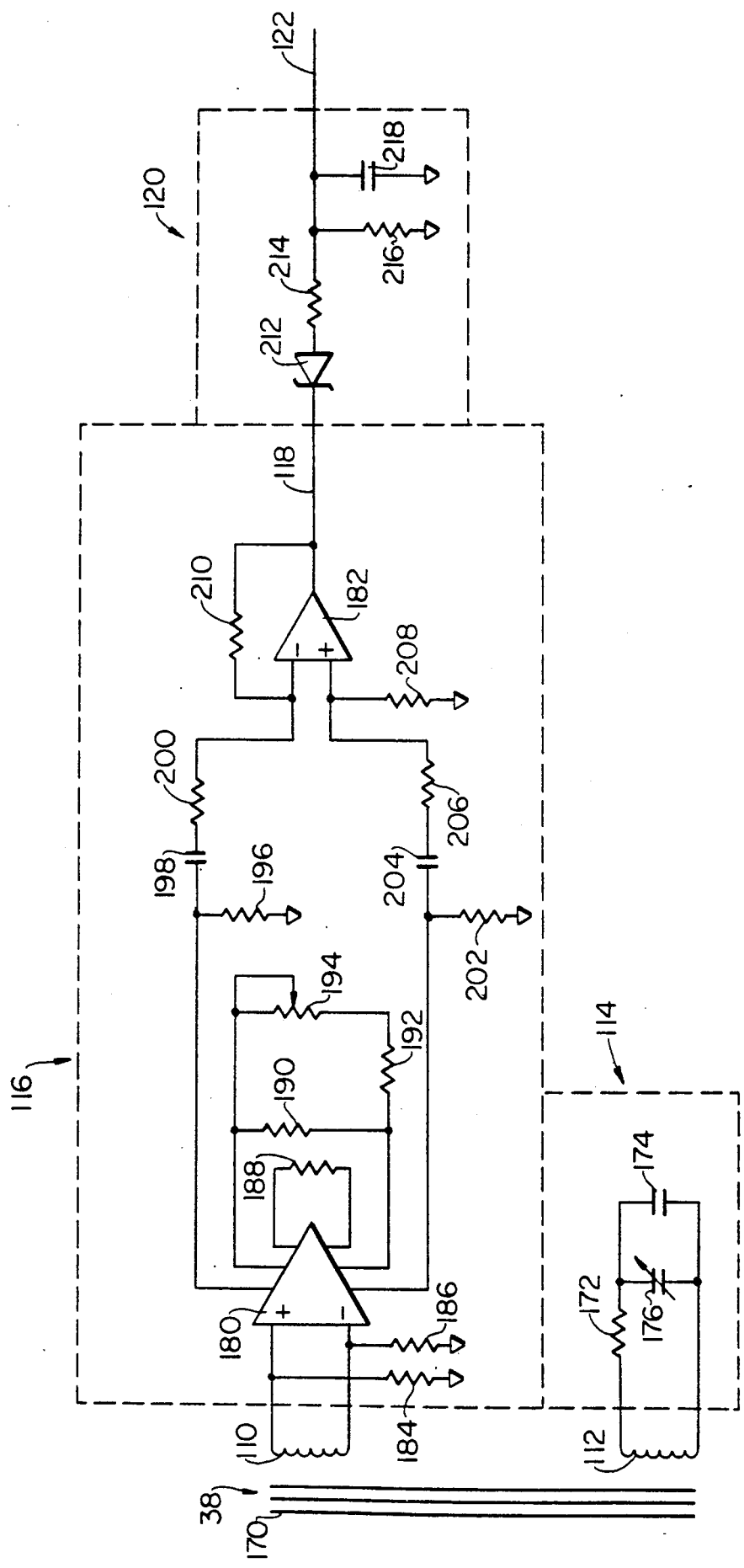
FIG. 7 is a schematic diagram of a portion of selected elements of the probe of FIG. 3.
Figure 8:
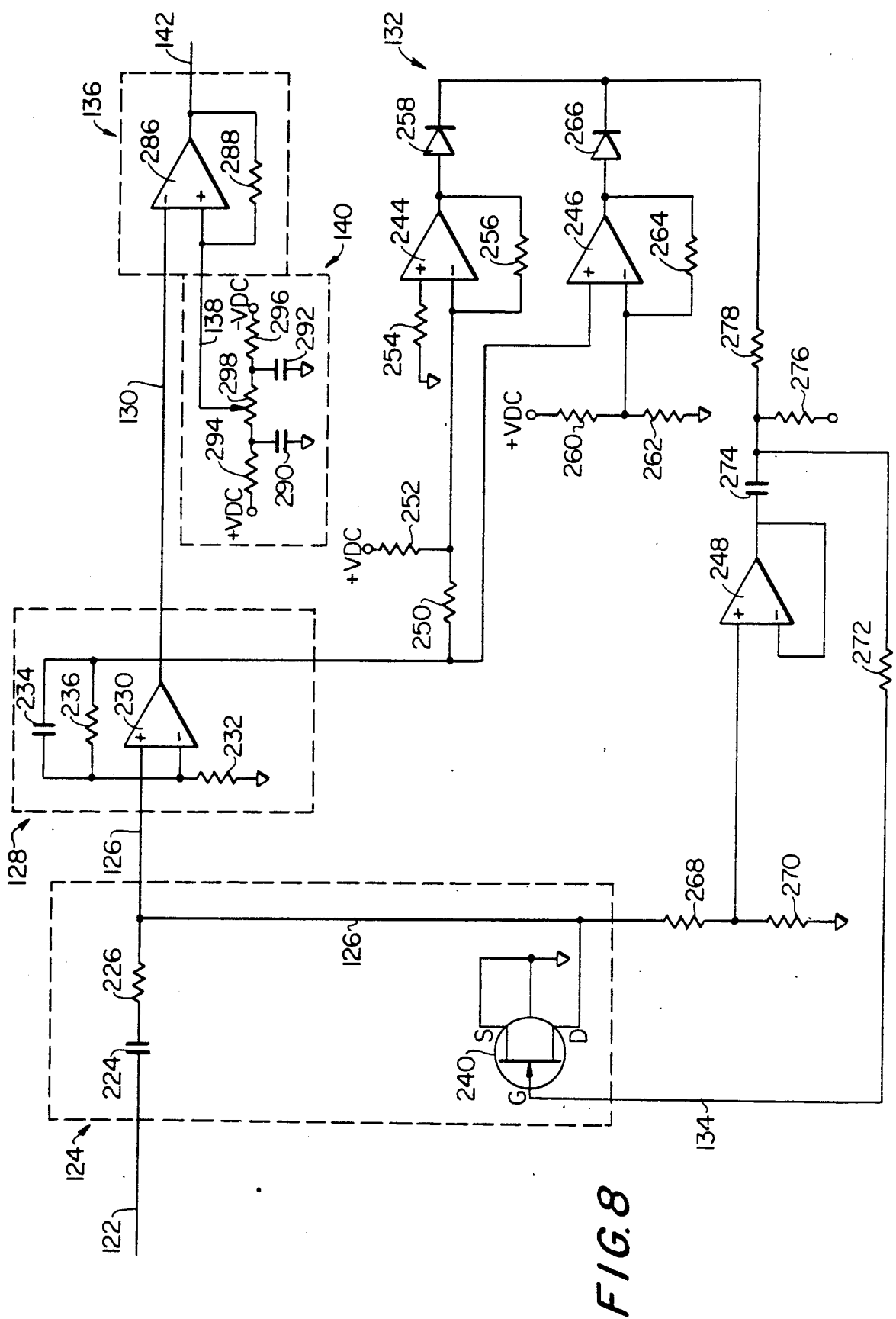
FIG. 8 is a schematic diagram of a portion of further selected elements of the probe of FIG. 3.

FIGS. 7 and 8 illustrate circuitry within the RPM probe in greater detail. The first antenna coil 110, which is connected to inputs of the RF amp 116, has an inductance of approximately 40 microhenrys and is centered on a ferrite rod 170. The second antenna coil 112, which connects to the tuning circuit 114, is centered on the first coil. The rod 170 is insulated with mylar or teflon tape.

The tuning circuit 114 comprises a resistor 172 connected in series with a parallel combination of a fixed capacitor 174 and a variable capacitor 176. The RF amp 116 is comprised of a first amplifier 180, e.g., a model LM733 differential video amplifier, a second amp 182 e.g., a model OPA620 wide band operational amplifier (op amp), and various support components 184–210. The output of the RF amp on the line 118 is a signal having both positive and negative peaks.

The RF amp output on the line 118 is fed to the detector 120, which is comprised of a diode 212, two resistors 214,216 and a capacitor 218. The detector output on the line 122 is a single polarity pulse which is fed to the audio amp 128 through a capacitor 224 and resistor 226 which comprise a portion of the shunt attenuator 124. The resistor 226 is connected by the line 126 to an op amp 230, e.g., type LF347N, having associated support components 232-236.

The signal line 126 is also connected to the drain terminal of a model 2N3821 field effect transistor (FET) 240. The FET 240 comprises a portion of the shunt attenuator 124, the input (gate terminal) of which is fed on the line 134 from the AGC circuit 132. The AGC is comprised of three op amps 244,246,248, e.g., type LF347N, together with support components 250-278.

The output of the audio amp 128 on the line 130 is fed to both the AGC circuit 132 and an input of the comparator 136. The comparator typically comprises a model LM311 precision comparator 286 with feedback resistor 288. The other input of the comparator is fed from the adjustable voltage reference, comprised of two capacitors 290,292, two fixed resistors 294,296, and a variable resistor (potentiometer) 298. The potentiometer 298 adjusts the voltage level on the comparator input.

Referring also to FIG. 6 again, the comparator output on the line 142 is fed to the line driver 144, e.g., type 75174N from Texas Instruments, the output of which is fed on the line 146 to the connector 48.

Figure 9:
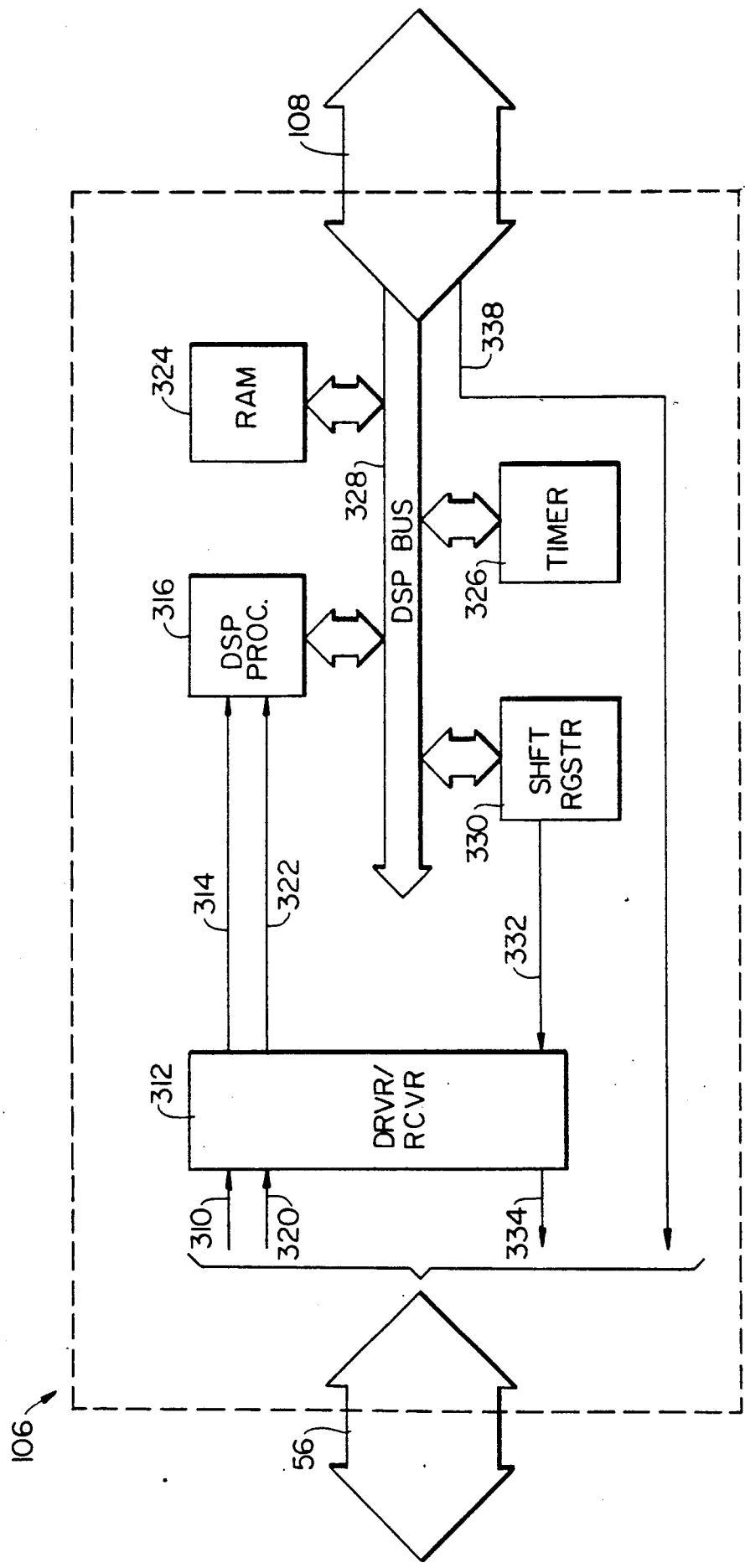
FIG. 9 is a block diagram of further selected elements of the testing system of FIGS. 1, 2.

FIG. 9 illustrates a block diagram of the DSP circuitry 106 in the CIU 14. Included among the signal lines 56 is a signal on a line 310 indicative of the closure status of the restart switch 42. The restart signal is fed to a line receiver within a line receiver/driver block 312, and then on a line 314 to an interrupt input of a DSP processor (DSP PROC) 316, typically a Texas Instruments Model TMS320C25 digital signal processor IC. The DSP PROC 316 is the primary signal processor on the DSP circuitry 106 and it calculates engine RPM in accordance with the present invention, as described in detail hereinafter. The processing of the restart signal by the DSP PROC is also described hereinafter.

The pulsed signal from the RPM probe 26 is fed on a line 320 to a line receiver 312, and then on a line 322 to an interrupt of the DSP PROC 316. The processing of the pulsed RPM signal by the DSP PROC is described hereinafter.

Also included as part of the DSP circuitry 106 is RAM 324, which stores the software comprising the statistical algorithm along with program operating parameters. A timer 326, e.g., an Intel Corp. Model 82C54 IC, provides a 100 millisecond real time clock (RTC) interrupt to the DSP PROC in conjunction with the statistical algorithm. The DSP PROC, timer 326, and RAM 324 communicate with each other by way of a DSP bus 328, which includes address, data, and control lines. The DSP bus forms a part of the signal lines 108 which connect to the CIU bus 72. In this way, other portions of the CIU 14 (FIG. 5) can communicate with the DSP circuitry.

A shift register 330 is provided through which the DSP PROC can communicate data to the RPM probe 26 so as to flash the LED 44 thereon when the DSP PROC is receiving an intelligible pulsed signal from the RPM probe on the line 322. The output of the shift register 330 is provided on a line 332 to a line driver 312, and then on a signal line 334 which forms a part of the signal lines 56.

The DSP circuitry also provides power to the RPM probe in the form of various DC voltages, the power being provided to the lines 56 on lines 338 from the CIU bus 72.

In operation, the operator holds the RPM probe 26 in proximity to the engine of a vehicle under test, either with or without the hood open. The sensing of radiated electromagnetic signals in the radio frequency range allows the RPM probe to be located at a greater distance from the engine and still produce an accurate indication of engine RPM, as compared to prior art non-contacting tachs that sense electromagnetic signals in the lower frequency 5 KHz to 30 KHz range. Further, there is no need for the RPM probe to touch or make contact with engine components in order to make an accurate RPM measurement.

The exhaust probe 24 is inserted into the vehicle exhaust pipe, and an emissions test is activated by the operator by appropriate keyboard selections based on information provided on the video monitor 16 as a part of an emissions testing software program executed by the CIU 14.

Typically, the operator desires to run an emissions test as part of mandatory emissions testing program, or as part of a vehicle performance test executed during the diagnosis and/or repair of the vehicle. During test execution, the engine is idled at various desired speeds. The RPM probe senses the electomagnetic energy radiated by the engine from the spark plug firings and other electrical events. The probe circuitry provides the pulsed signal indicative of the electrical engine events to the DSP circuitry, where the DSP PROC executes the statistical algorithm to derive engine RPM therefrom.

The basic formula for computing RPM for any spark ignition engine is as follows:

$$RPM = 120/(K*T) \qquad \text{(Equation 1)}$$

where K is the number of spark plug firings per 2 revolutions of the crankshaft (i.e., number of cylinders for non-rotary engines; K=4 for rotary engines); and T is the fundamental time (in seconds) between firings. Normally K is known; thus T must be determined.

Ideally, the RPM probe 26 interrupts the DSP PROC 316 every time a spark plug fires. The time T between these interrupts is measured by an internal DSP PROC timer/counter, and, assuming K is known, the RPM can be computed. In practice, however, not all spark plugs fire all of the time and not every plug firing may be detected by the probe. Thus, in order to provide an accurate indication of engine RPM, a statistical approach is used, in accordance with an aspect of the present invention. In the statistical approach, a large number of time samples are collected and processed to determine the fundamental spark time, T, and hence, RPM.

The program executed by the DSP PROC in calculating RPM may be separated into two parts: foreground and background. FIGS. 10a, 10b, 10c, and 11, illustrate, in flowchart form, the foreground and background software routines These routines are executed by the DSP PROC in implementing a preferred embodiment of the statistical algorithm of the present invention.

Figure 10A:
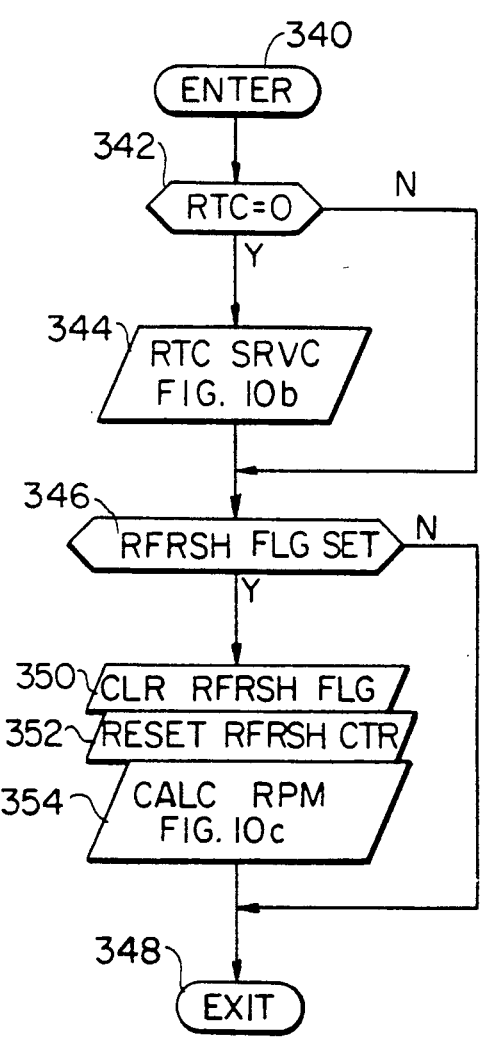
FIGS. 10a, 10b, 10c, and 11 are flowchart diagrams used in the present invention for computing vehicle engine RPM.

FIG. 10a illustrates a flowchart of the main foreground loop subroutine. The timer 326 (FIG. 9) is programmed to provide a 100 millisecond RTC. After an enter step 340 in FIG. 10a, the DSP PROC checks, in a test 342, if the RTC has expired If so, the DSP PROC executes a RTC service subroutine 344 of FIG. 10b, as described in detail hereinafter.

If the RTC has not expired, the DSP PROC checks, in a test 346, if the refresh flag is set. As described hereinafter, the refresh flag is set in the background subroutine of FIG. 11. If the refresh flag is not set, the subroutine exits in a step 348. If the refresh flag is set, a routine 350 is executed which clears the refresh flag, and then a refresh counter implemented in DSP RAM is reset to one in a routine 352. The DSP PROC then calculates engine RPM in the subroutine 354 of FIG. 10c, as described hereinafter. The foreground subroutine of FIG. 10a then exits in the step 348.

Figure 10B:
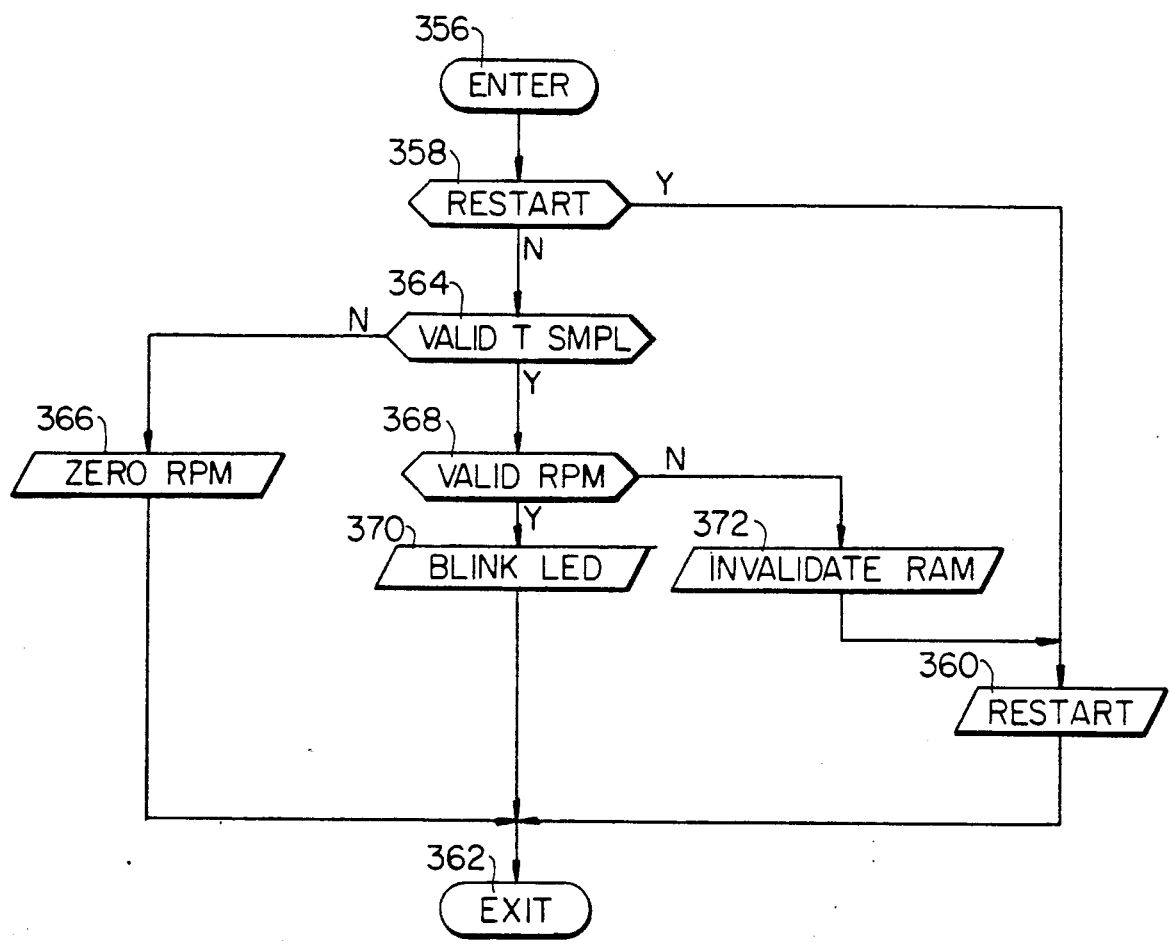

Referring to the RTC service subroutine of FIG. 10b, following an enter step 356, the restart switch 42 on the RPM probe 26 is checked for closure in a test 358. If a closure is detected, a restart routine 360 is executed wherein variables and counters used in the subroutines of FIGS. 10a, 10b, 10c, and 11 are initialized. The subroutine of FIG. 10b then exits in a step 362.

If the restart switch is not closed, the DSP PROC checks in a test 364 if at least one valid time sample was obtained (FIG. 11) in the last second. If no valid time sample was obtained, the RPM display (FIG. 12) is zeroed in a routine 366, but a time sample buffer in RAM is retained, and the subroutine exits in the step 362.

If a valid time sample was obtained in the last second, the DSP PROC checks in a test 368 if at least one valid RPM computation (FIG. 10c) was performed in the last second. If so, a routine 370 is executed where the LED 44 on the RPM probe is blinked to indicate that the DSP circuitry 106 is receiving an intelligible signal from the RPM probe. If a valid RPM computation was not performed in the last second, the RPM display is made invalid (e.g., FFFF HEX is displayed) in a routine 372, the restart routine 360 is executed, and the subroutine exits in the step 362.

Figure 11:
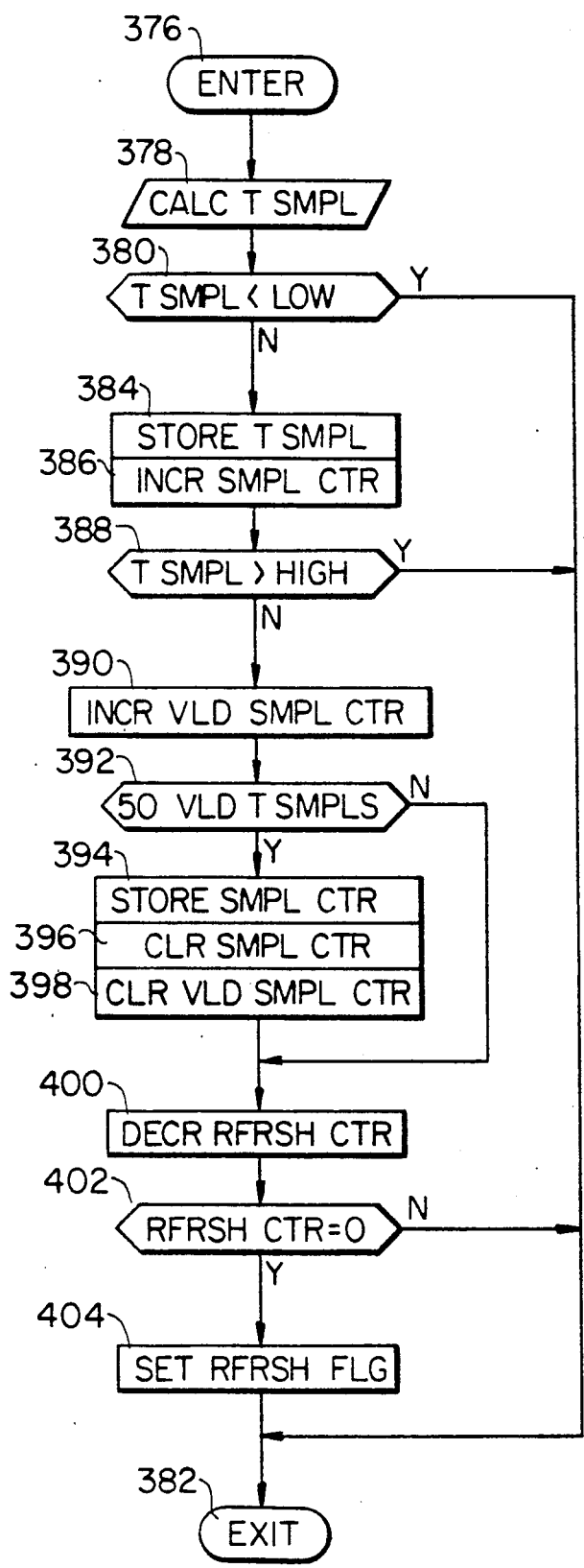

Referring to FIG. 11, the DSP PROC executes the background subroutine each time the pulsed signal from the RPM probe interrupts the DSP PROC. Following an enter step 376 in FIG. 11, the DSP PROC executes a routine 378 wherein time samples are filtered and stored in a buffer in RAM 324. The DSP PROC internal 16-bit timer/counter has 100 nanosecond time resolution (i.e. cycle time of the DSP PROC). Another 16-bit word is added and incremented each time the internal timer wraps around to provide a resulting 32-bit free running timer. In this routine 378, the timer value is stored in RAM and subtracted from the previous stored timer value to produce a 32-bit 100 nanosecond time sample which is stored in RAM.

Next, the DSP PROC checks if the time sample calculated in the routine 378 is valid by first comparing it in a test 380 to see if it is less than a low limit. A time sample is considered valid if within high and low limits. The limits are based upon the RPM bandwidth (300–5,000 RPM) for the RPM probe. The limits are also dependent upon the value of K in equation (1). For example, if K=4, the high limit is 100,000 microseconds (RPM=300) and the low limit is 6,000 microseconds (RPM=5,000). In this case, a time sample less than the low limit usually indicates noise. If the time sample is less than the low limit, the background subroutine exits in a step 382.

If the current time sample is greater than the low limit, the sample is stored in DSP RAM in a step 384, and a sample counter in DSP RAM is incremented by one in a step 386. The DSP PROC then checks in a test 388 if the time sample is greater than the high limit. If so, the background subroutine exits in the step 382. If the time sample is less than the high limit (and therefore valid) a valid sample counter implemented in DSP RAM is incremented in a step 390.

Next, the valid sample counter is checked in a test 392 for a value of fifty, and if so, the value (N) of the sample counter is stored in DSP RAM in a step 394, the sample counter is cleared in a step 396, and the valid sample counter is cleared in a step 398. The value (N) of the sample counter is used hereinafter in the calculate RPM subroutine. The DSP then decrements the refresh counter in a step 400. The refresh counter is initialized to fifty in the restart routine 360 of the RTC service subroutine of FIG. 10b. However, the refresh counter is reset to one in the routine 352 just before the calculate RPM routine 354 is executed each time in the subroutine of FIG. 10a.

If the valid sample counter does not equal fifty (test 392), the subroutine branches to the decrement refresh counter step 400. The DSP PROC then checks in a test 402 if the value of the refresh counter equals zero, and if not, the subroutine exits in the step 382. If so, the refresh flag is set in a step 404 and the subroutine of FIG. 11 exits in the step 382.

Figure 10C:
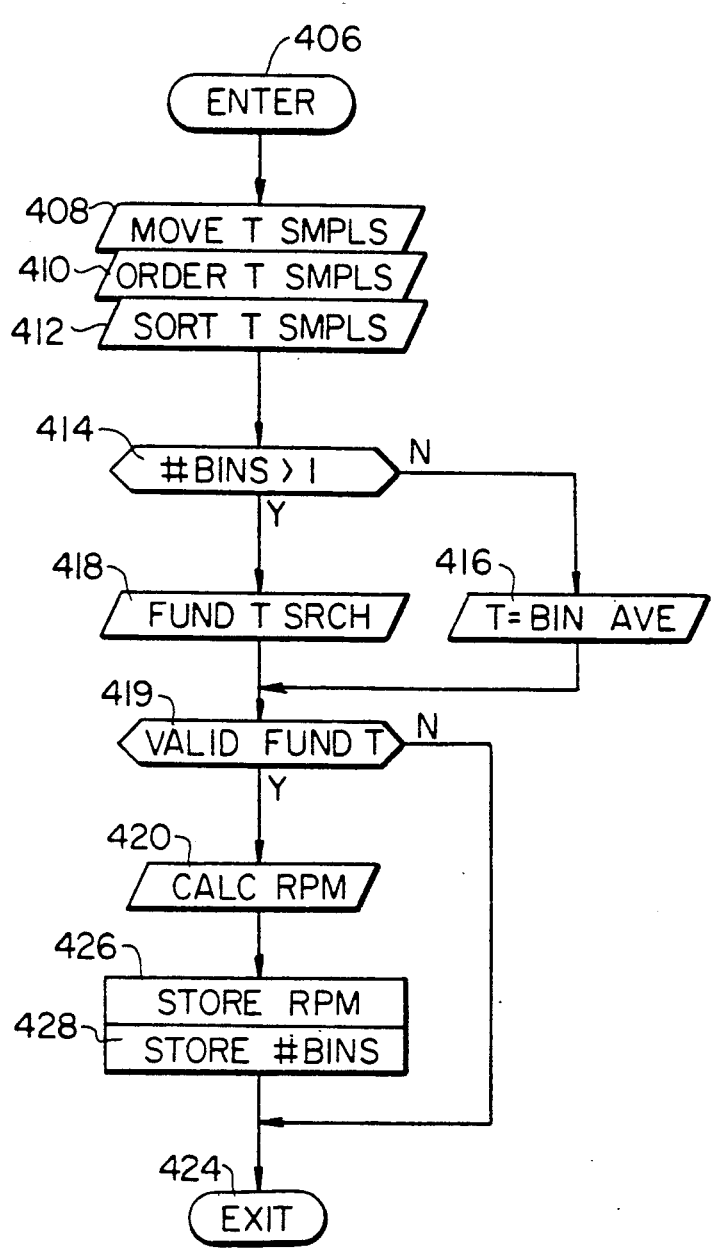

Referring to FIG. 10c, after an enter step 406, a routine 408 is executed wherein the last N time samples collected by the DSP PROC 316 are moved from a buffer area in DSP RAM 324 to a temporary storage area in DSP RAM for subsequent processing. The time samples are then ordered from smallest to largest in a routine 410. Next, a routine 412 is executed wherein the time samples are sorted into bins. In this sorting routine 412, the first bin time is initialized to the value of the first (smallest) time sample and the first bin weight is initialized to one. The next time sample is compared to the last time sample placed in the bin to determine if a discontinuity, or time gap, has been encountered. If not, the time sample is added to the bin time and the bin weight is incremented. If so, a new bin is initialized and the average time of the previous bin is computed by dividing the total bin time by the total bin weight. The discontinuity limit used to decide whether or not to start a new bin is simply 10% of the last time sample added to the bin. The discontinuity limit is bounded at the lower end by 100 microseconds. If the difference between the next time sample and this time sample is greater than the discontinuity limit, a new bin is started. This averaging procedure is repeated until all N time samples are sorted into bins.

In the ideal case, N will be 50 and all 50 time samples will be reduced to one bin with the average value being the fundamental spark time. Although this is possible and will indeed occur sometimes, it is hardly the norm. Usually, spark plugs will misfire or the RPM probe may fail to pick up every spark plug firing Also, the RPM probe may interrupt the DSP PROC due to random noise in the test environment. As a result, some of the time samples will be two, three, four, etc. times the fundamental spark time while other time samples will be irrelevant. The samples that are a multiple of the fundamental time are referred to as harmonics.

A division process is used to determine if any bin is a harmonic of another. As a rule, the bin with a greater average value is a possible harmonic of the other. The possible harmonic bin is divided by the other bin and the quotient is checked to see if the possible harmonic bin is a multiple of the other, within some specified tolerance. For example, assume that BIN2 is suspected to be the first harmonic of BIN1 and that the allowable tolerance is 0.02. If the absolute value of the quotient minus 2 is less than or equal to 0.02, then BIN2 is the first harmonic of BIN1 (i.e. ABS(BIN2 / BIN1 −2)< =0.02). Similarity, BIN2 can be checked to see if it is the second, third, fourth, etc. harmonic of BIN1.

Once the sorting routine 412 is complete, the DSP PROC checks in a test 414 if the total number of bins is greater than one. If not, the average value of the single bin is made equal to the fundamental time in a routine 416. If multiple bins result, a fundamental time search routine 418 is executed. In the fundamental time search, every bin is considered a possible fundamental, while all other bins are checked for harmonics of the possible fundamental. Each bin is checked to see if it is the first through the Kth harmonic of the possible fundamental bin. If it is determined that the bin is a harmonic, its weight is added to the sum of the possible fundamental bin weight plus the weight of all the other harmonic bins of that possible fundamental. Then the bin that yields the maximum sum weight of fundamental plus harmonics is the true fundamental time bin.

The final criteria to be satisfied before using the resulting fundamental time in equation (1) is that the sum weight of the fundamental time bin plus all of the harmonic bins be greater than some predetermined limit. The suggested limit is that the sum weight be greater than or equal to half the number of valid time samples used in the RPM computation. This criteria ensures that the fundamental time is real and not the result of random noise.

Once the fundamental time (T) has been determined in the routine 418, the DSP PROC checks in a test 419 for a valid fundamental time, T, using the aforementioned time limits of the background subroutine of FIG. 11. If the fundamental time is invalid, the subroutine exits in a step 424. If the fundamental time is valid, the DSP PROC computes the RPM value in a routine 420 using equation (1). The only other variable in equation (1) is K, which is simply the number of cylinders (K=4 for rotary engines). In practice, K is entered by the operator through the keyboard 20 at the start of the emissions test. The entered value for K is interpreted by the CPU 70 in the CIU 14 and is loaded into a location in DSP RAM 324 for access by the DSP PROC 316 when calculating RPM in the routine 420.

Note that as part of the restart initialization routine 360 in the subroutine of FIG. 10b, the DSP PROC reads the DSP RAM location containing the value of K and calculates the time limits for the vehicle engine under test.

Figure 12:
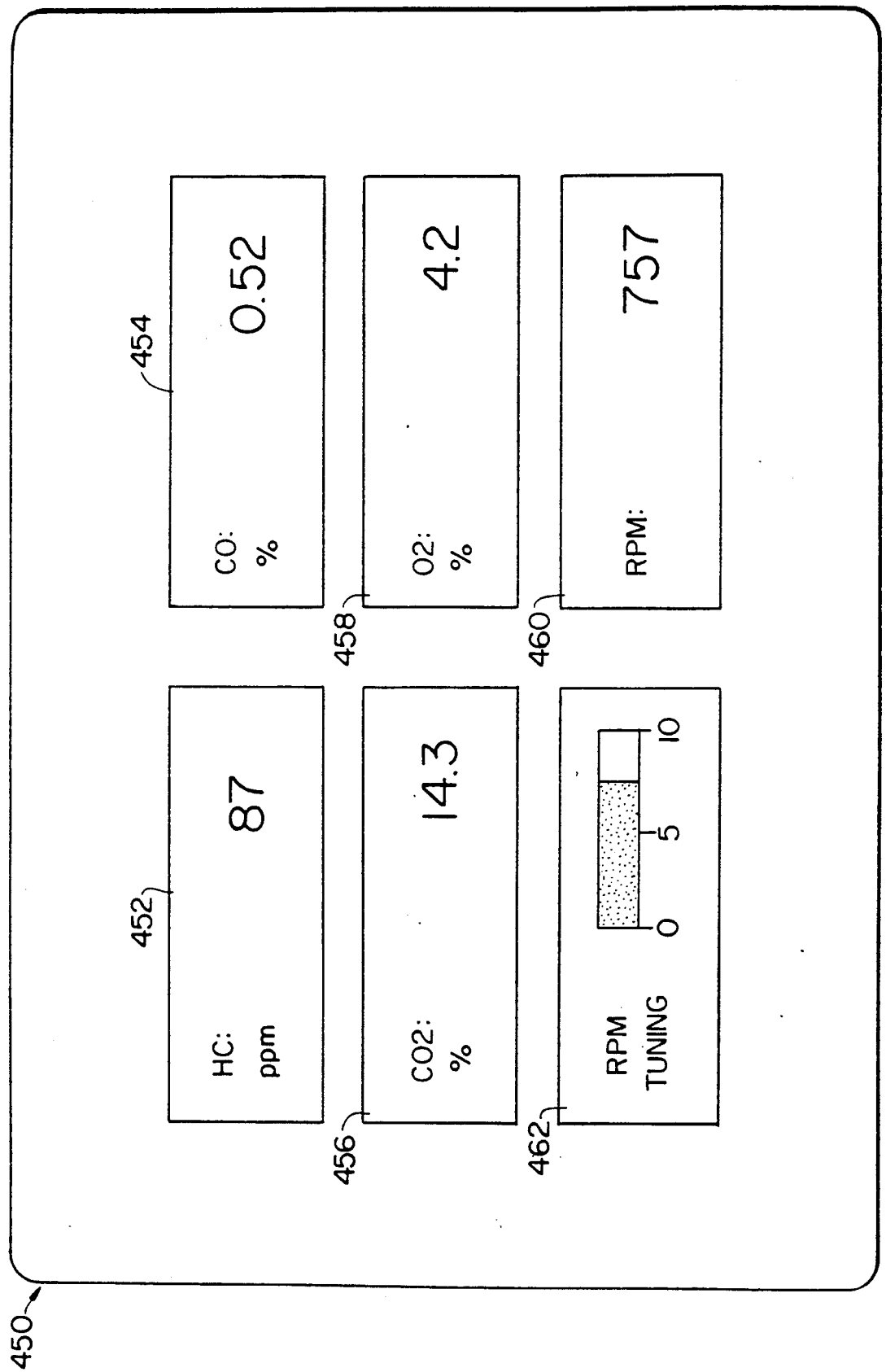
FIG. 12 is an illustration of a display of vehicle emissions data together with engine RPM and a bar graph of electromagnetic signal strength in accordance with a second aspect of the present invention.

After the RPM value is calculated, it is stored in a step 426 into a DSP RAM location that is also accessed by the CIU CPU 70 for display on the video monitor 16 in accordance with FIG. 12. Also, the number of bins resulting from the sorting routine is stored in DSP RAM 324 in a step 428 for display on the video monitor of a "tuning meter" (FIG. 12) in accordance with an aspect of the present invention. The subroutine of FIG. 10c then exits in the step 424.

In a typical emissions test procedure, the operator utilizes the non-intrusive engine RPM probe 26 of the present invention along with the exhaust probe 24 to determine vehicle emissions performance. The CEA 22 senses the concentrations of certain gases, e.g., hydrocarbon (HC), carbon monoxide (CO), carbon dioxide (CO2), and oxygen (02), in the vehicle exhaust. The CEA-processed gas concentration data is communicated to the CIU 14 over the CEA link 60. The emissions test software loaded on the hard disk 76 and executed by the CPU 70 implements the display of the resulting emissions test data on the video monitor 16.

FIG. 12 illustrates an exemplary display screen 450 containing a display of the four exemplary gas concentrations 452-458 along with a display 460 of calculated RPM. Also illustrated is the tuning meter 462 which comprises a bar graph depicting the signal strength of the electromagnetic signal sensed by the RPM probe. The signal strength is inversely proportional to the number of bins calculated by the sorting routine 426 in the subroutine of FIG. 10c. This is true because a strong electromagnetic signal with few harmonics and little or no noise will yield a lower bin count and a higher indication on the tuning meter. Thus, the tuning meter can aid the operator in finding the optimal placement for the RPM probe in the vicinity of the engine so as to yield the most accurate RPM measurement. Also, in the blink LED routine 370 of the RTC service subroutine of FIG. 10b, the LED may be blinked at a rate corresponding to the signal strength.

Alternatively, the present invention may be implemented in an embodiment which comprises solely an independent hand-held, non-intrusive probe containing all of the necessary hardware and software to sense the radiated electromagnetic signals and calculate RPM therefrom. This type of embodiment may be desired in those instances where all that is required is an indication of engine RPM, the indication being desired independent of the measurement and display of other vehicle parameters as in the aforementioned preferred embodiment.

Figure 13:
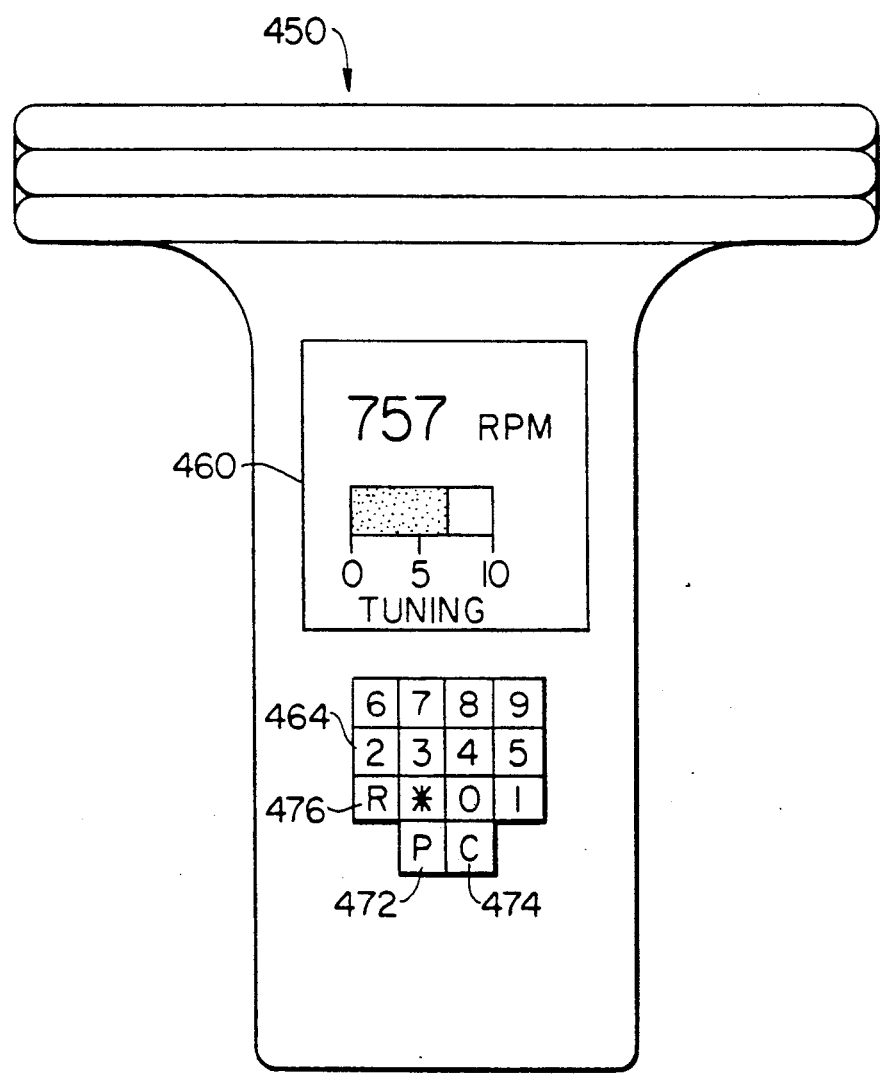
FIG. 13 is a perspective diagram of a tachometer probe in accordance with an alternative embodiment of the present invention.

FIG. 13 illustrates the independent RPM probe 450 in accordance with a third aspect of the present invention. The probe 450 is similar in construction and content to that of the preferred embodiment of FIG. 3, except for the elimination of the restart switch 42 and LED 44 and the inclusion of several necessary features to make the probe a complete operative device, independent of any connection to external equipment.

Figure 14:
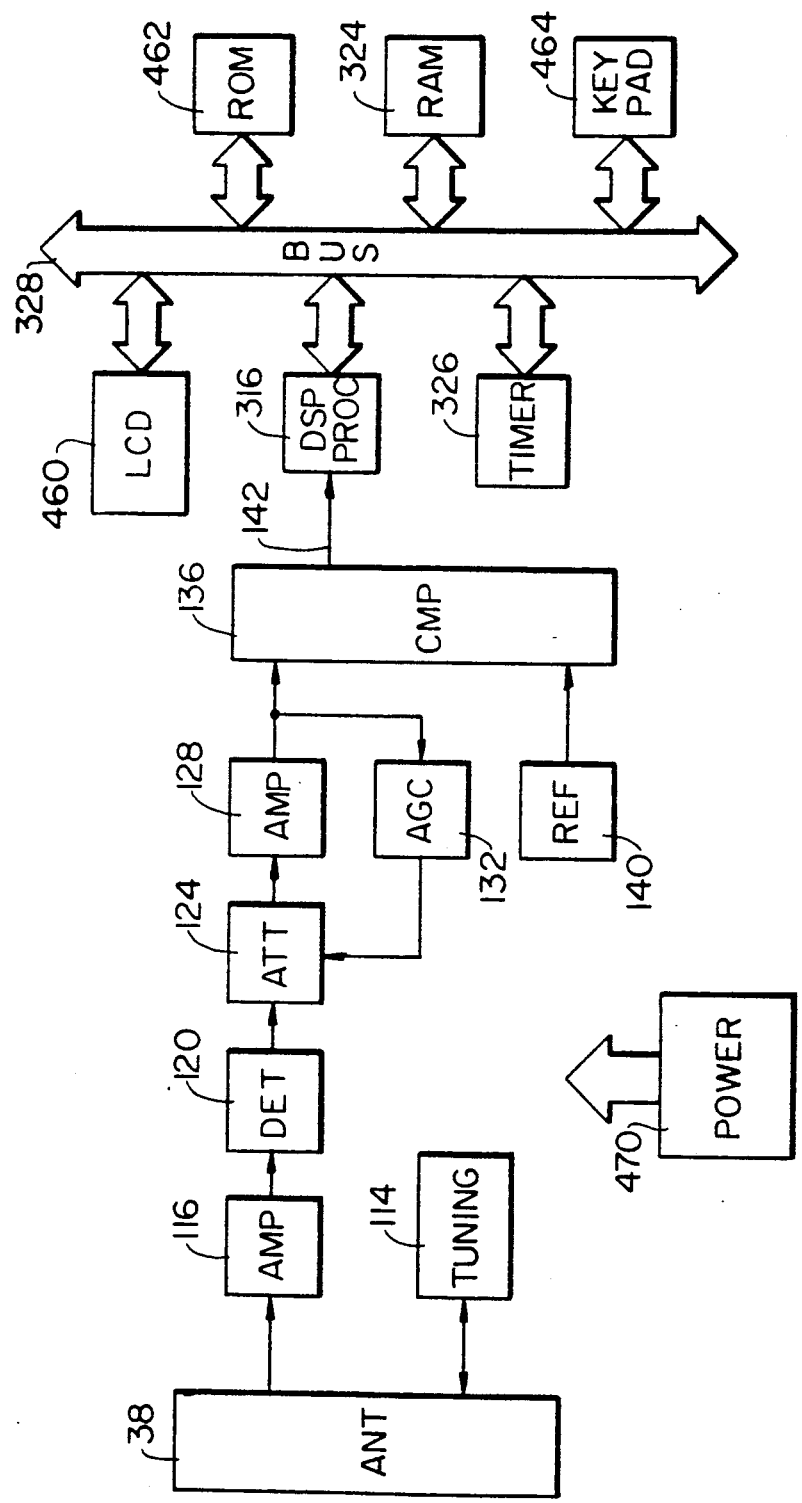
FIG. 14 is a block diagram of selected elements of the probe of FIG. 13.

FIG. 14 is a block diagram of the circuitry located within the RPM probe 450. Several of the blocks are identical to those illustrated in FIGS. 6-9: specifically, the antenna 38, tuning circuit 114, RF amp 116, detector 120, attenuator 124, audio amp 128, AGC 132, reference 140 and comparator 136, along with the DSP PROC 316, timer 326, RAM 324 and bus 328. The output of the comparator 136 on the line 142 is fed directly to the DSP PROC, which executes the flowcharts of FIGS. 10-11.

Also connected to the bus and unique to this alternative embodiment is a liquid crystal display (LCD) 460, read only memory (ROM) 462, and a keypad 464. The LCD 460 displays an indication of engine RPM, as calculated by the DSP PROC. The LCD also displays a tuning meter, similar to tuning meter display 462 of FIG. 12, in a bar graph format. As in the preferred embodiment, the tuning meter indicates the inverse of the number of bins as calculated by the sorting routine 426 in FIG. 10.

In this alternative embodiment, the DSP PROC executes additional software which interprets key closures on the keypad as well as updates the LCD display This additional software, which should be readily apparent to one skilled in the art, is stored in ROM 462 along with the software which implements the flowcharts of FIGS. 10-11.

The DC voltages supplied to the electronic components within the RPM probe are now derived directly from a power circuit 470 comprising a battery and appropriate voltage regulators. The operator uses the keypad 464 to start RPM probe operation. The key labeled 'P' 472 turns power on and off to the internal circuitry. Once power is applied, the LCD displays a prompt to the operator to enter the number of cylinders of the vehicle under test. The operator does this through the use of the numeric keys labeled 0 through 9 on the keypad. Once the number of cylinders has been entered, the DSP PROC executes the subroutines of FIGS. 10–11 and the LCD displays engine RPM and signal strength in accordance with FIG. 13. The key labeled 'C' 474 is used by the operator to clear the current LCD display, while the key labeled 'R' 476 is interpreted by the subroutine of FIG. 10 similarly to the restart switch of the preferred embodiment of the present invention.

It is to be understood that the electronic components comprising the probe signal processing means are exemplary; any arrangement of components may be chosen if desired. It suffice for the broadest aspect of the present invention that electromagnetic signals radiating from an operative engine be sensed and a pulsed signal indicative of engine electrical events be provided. Also, any arrangement of components for implementing the automatic gain control function of the present invention may be used in light of the teachings herein. Further, it is to be understood that the signal processing means responsive to the pulse signal for calculating an engine RPM signal therefrom are exemplary. It suffice for the broadest aspect of the present invention that the components chosen be responsive to the pulsed signal in calculating therefrom a fundamental time between firings and resulting engine RPM.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

We claim:

1. Apparatus for measuring the operational rate in revolutions per minute (RPM) of an internal combustion engine having a spark ignition system including a plurality of spark plugs, the spark ignition system radiating electromagnetic energy signals upon spark electrical discharges, the radiated electromagnetic energy signals corresponding to changing electrical current circulating in the conductive paths in the engine, said apparatus comprising:
   detection means, for sensing the electromagnetic energy signals radiating from the engine, and for providing in response thereto sensed spark signals indicative thereof;
   probe signal processing means, responsive to said sensed spark signals, for providing a pulse signal having pulses indicative of said sensed spark signals;
   second signal processing means, responsive to said pulse signal for determining therefrom a time between firings of the spark plugs and for providing a fundamental time signal indicative thereof, for determining actual engine RPM from said fundamental time signal and for providing a calculated engine RPM signal indicative thereof; and
   display means, for displaying visually the value of said calculated actual engine RPM signal; and keypad means for providing desired operator input signals to said second signal processing means;
   said detection means, said probe signal processing means, said second signal processing means, and said display means being integrated together within a hand-held probe assembly, whereby said hand-held probe assembly comprises a complete device independent of any connections to external equipment and operable to measure and indicate the actual engine RPM.

2. Apparatus for measuring the operational rate in revolutions per minute (RPM) of an internal combustion engine having a spark ignition system including a plurality of spark plugs, the spark ignition system radiating electromagnetic energy signals upon spark electrical discharges, the radiated electromagnetic energy signals corresponding to changing electrical current circulating in the conductive paths in the engine, said apparatus comprising:
   detection means, for sensing the electromagnetic energy signals radiating from the engine in a frequency range of from 1 MHZ to 10 MHZ, and for providing in response thereto sensed spark signals indicative thereof;
   probe signal processing means, responsive to said sensed spark signals, for providing a pulse signal having pulses indicative of said sensed spark signals;
   second signal processing means, responsive to said pulse signal for determining therefrom a time between firings of the spark plugs and for providing a fundamental time signal indicative thereof, for determining actual engine RPM from said fundamental time signal and for providing a calculated actual engine RPM signal indicative thereof; and
   display means, for displaying visually the value of said calculated actual engine RPM signal.

3. The apparatus of claim 2, wherein said detection means comprises an antenna tuned to said frequency range of from 1 MHz to 10 MHZ.

4. The apparatus of claim 2, wherein said second signal processing means further comprises means, responsive to said pulse signal, for providing an amplitude signal indicative of the ability of said sensed spark signals to accurately indicate valid firings of the spark plugs.

5. The apparatus of claim 2, wherein said second signal processing means comprises means, responsive to said pulse signal, for determining said time between firings as the time between successive pulses of said pulse signal, for developing a time signal having a magnitude indicative of said determined time between plug firings, for collecting a plurality of successive ones of said time signals as developed over time, for ordering said plurality of time signals in magnitude from smallest to largest, for sorting said ordered time samples into one or more bins, each bin having upper and lower boundary criteria based on a range of magnitude of time that any one of said time samples may lie within, for averaging the time value of each of the resulting one or more of said bins, whereby, if a single bin results as a result of said sorting of said ordered time samples, said fundamental time signal equals the average time value of said single bin, and for determining said fundamental time signal if a plurality of bins result from said sorting of said ordered time samples.

6. Apparatus for measuring the operational rate in revolutions per minute (RPM) of an internal combustion engine having a spark ignition system including a plurality of spark plugs, the spark ignition system radiating electromagnetic energy signals upon spark electrical discharges, the radiated electromagnetic energy signals corresponding to changing electrical current circulating in the conductive paths in the engine, said apparatus comprising:

detection means, for sensing the electromagnetic energy signals radiating from the engine, and for providing in response thereto sensed spark signals indicative thereof;

probe signal processing means, responsive to said sensed spark signals, for providing a pulse signal having pulses indicative of said sensed spark signals;

second signal processing means, responsive to said pulse signal for determining therefrom a time between firings of the spark plugs and for providing a fundamental time signal indicative thereof, for determining actual engine RPM from said fundamental time signal and for providing a calculated actual engine RPM signal indicative thereof; and display means, for displaying visually the value of said calculated actual engine RPM signal;

said second signal processing means and said display means being disposed to be located apart from said detection means and said probe signal processing means, said detection means and said probe signaling processing means being integrated together within a hand-held probe assembly, said second signal processing means and said display means being integrated within a vehicle emissions testing system assembly, said vehicle emissions testing system operable for measuring the actual concentration value of each of one or more predetermined vehicle emissions gases emitted by an operative internal combustion engine.

7. The apparatus of claim 6 further comprising connecting means, for electrically connecting said probe signal processing means with said second signal processing means, said connecting means comprising means for communicating said pulse signal from said probe signal processing means to said second signal processing means, whereby in normal operation of said apparatus said hand-held probe assembly is held by an operator in close proximity to the engine of a vehicle under test while said vehicle emissions testing system may be located at a distance from the vehicle under test.

8. Apparatus for measuring the operational rate in revolutions per minute (RPM) of an internal combustion engine having a spark ignition system including a plurality of spark plugs, the spark ignition system radiating electromagnetic energy signals upon spark electrical discharges, the radiated electromagnetic energy signals corresponding to changing electrical current circulating in the conductive paths in the engine, said apparatus comprising:

detection means, for sensing the electromagnetic energy signals radiating from the engine, and for providing in response thereto sensed spark signals indicative thereof;

probe signal processing means, responsive to said sensed spark signals, for providing a pulse signal having pulses indicative of said sensed spark signals;

second signal processing means, responsive to said pulse signal for determining therefrom a time between firings of the spark plugs and for providing a fundamental time signal indicative thereof, for determining actual engine RPM from said fundamental time signal and for providing a calculated actual engine RPM signal indicative thereof, and for providing an amplitude signal indicative of the ability of said sensed spark signals to accurately indicated valid firings of the spark plugs; and display means, for displaying visually the value of said calculated actual engine RPM signal.

9. The apparatus of claim 8, wherein said display means comprises means for displaying visually said amplitude signal, said displayed amplitude signal being indicative of an optimum placement of said hand-held probe assembly in proximity to the vehicle under test.

10. The apparatus of claim 9, wherein said display means comprises means for displaying visually said amplitude signal in a bar graph format.

11. The apparatus of claim 8, wherein said probe signal processing means further comprises automatic gain control means for providing said pulse signal with an amplitude that is substantially constant, whereby said automatic gain control means compensates the amplitude of said pulse signal for the normally varying magnitude of the electromagnetic energy signals radiating from the engine.

12. The apparatus of claim 8, wherein said probe signal processing means comprises means for providing said pulse signal in response to each of said sensed spark signals having an amplitude in excess of a predetermined threshold.

13. Apparatus for measuring the operational rate in revolutions per minute (RPM) of an internal combustion engine having a spark ignition system including a plurality of spark plugs, the spark ignition system radiating electromagnetic energy signals upon spark electrical discharges, the radiated electromagnetic energy signals corresponding to changing electrical current circulating in the conductive paths in the engine, said apparatus comprising:

detection means, for sensing the electromagnetic energy signals radiating from the engine in a frequency range of from 1 MHZ to 10 MHZ, and for providing in response thereto sensed spark signals indicative thereof;

probe signal processing means, responsive to said sensed spark signals, for providing a pulse signal having pulses indicative of said sensed spark signals;

second signal processing means, responsive to said pulse signal for determining therefrom a time between firings of the spark plugs and for providing a fundamental time signal indicative thereof, for determining actual engine RPM from said fundamental time signal and for providing a calculated actual engine RPM signal indicative thereof, for determining said time between firings as the time between successive pulses of said pulse signal, for developing a time signal having a magnitude indicative of said determined time between plug firings, for collecting a plurality of successive ones of said time signals as developed over time, for ordering said plurality of time signals in magnitude from smallest to largest, for sorting said ordered time samples into one or more bins, each bin having upper and lower boundary criteria based on a range of magnitude of time that any one of said time samples may lie within, for averaging the time value of the resulting one or more of said bins, whereby, if a single bin results as a result of said sorting of said ordered time samples, said fundamental time signal equals the average time value of said single bin, and for determining said fundamental time signal if a plurality of bins result from said sorting of said ordered time samples; and display means, for displaying visually the value of said calculated actual engine RPM signal.

14. The apparatus of claim 13, wherein said second signal processing means further comprises means for dividing the average time value of each of said plurality of bins by the average time value of each other one of said plurality of bins, for determining a harmonic to be a whole number result within a tolerance range as a result of said dividing, for adding, for each said determined harmonic, a weight of the corresponding one of said each of said plurality of bins to a weight of the corresponding one of said each other one of said plurality of bins, said bin weight being determined as the number of said time samples in each of said plurality of bins as a result of said sorting of said ordered time samples, and for determining the value of said fundamental time signal as the average time value of the one of said plurality of bins corresponding to the sum result of said adding having the largest value.

15. The apparatus of claim 13, wherein said second signal processing means further comprises means for providing an amplitude signal indicative of the ability of said sensed spark signals to accurately indicate valid firings of the spark plugs, said amplitude signal being provided as the inverse of the number of said bins resulting from said sorting of said ordered time samples into one or more bins.

16. The apparatus of claim 15, wherein said display means comprises means for displaying visually said amplitude signal, said displayed amplitude signal being indicative of an optimum placement of said hand-held probe assembly in proximity to the spark ignition system of the vehicle under test.

17. The apparatus of claim 16, wherein said display means comprises means for displaying visually said amplitude signal in a bar graph format.

18. The apparatus of claim 17, further comprising indication means for displaying an indication of said amplitude signal at a repetition rate corresponding to the inverse of the number of bins resulting from said sorting of said ordered time samples into one or more bins.

19. A non-intrusive hand-held tachometer for measuring the operational rate in revolutions per minute (RPM) of an internal combustion engine having a spark ignition system including a plurality of spark plugs, the spark ignition system radiating electromagnetic energy signals upon spark electrical discharges, the radiated electromagnetic energy signals corresponding to changing electrical current circulating in the conductive paths in the engine, said tachometer comprising:

detection means, for sensing the electromagnetic energy signals radiating from the engine, and for providing sensed spark signals indicative thereof;

signal processing means, responsive to said sensed spark signals, for providing a pulse signal in response to each of said sensed spark signals having an amplitude in excess of a predetermined threshold, for determining from said pulse signal the time between firings of the spark plugs and for providing time signals indicative thereof; determining actual engine RPM from said time signals and for providing a calculated engine RPM signal indicative thereof, for providing an amplitude signal responsive to said pulse signal indicative of the ability of said sensed spark signals to accurately indicate valid firings of the spark plugs; and display means, for displaying visually the value of said calculated engine RPM signal.

20. The apparatus of claim 19, wherein said detection means, said signal processing means, and said display means are integrated together within a hand-held probe assembly, whereby said hand-held probe assembly comprises a complete tachometer independent of any connections to external equipment and operable to measure and indicate actual engine RPM.

21. The apparatus of claim 19, wherein said detection means comprises means for sensing the electromagnetic energy signals radiating from the spark ignition system in a frequency range of from 1 megahertz (MHz) to 10 MHz.

22. The apparatus of claim 21, wherein said detection means comprises an antenna tuned to said frequency range of from 1 MHz to 10 MHZ.

23. The apparatus of claim 19, wherein said display means comprises means for displaying visually said amplitude signal, said displayed amplitude signal being indicative of an optimum placement of said hand-held probe assembly in proximity to the vehicle under test.

24. The apparatus of claim 23, wherein said display means comprises means for displaying visually said amplitude signal in a bar graph format.

25. The apparatus of claim 19, wherein said signal processing means further comprises automatic gain control means for providing said pulse signal with an amplitude that is substantially constant, whereby said automatic gain control means compensates the amplitude of said pulse signal for the normally varying magnitude of the electromagnetic energy signals radiating from the engine.

26. The apparatus of claim 19, wherein said signal processing means comprises means, responsive to said pulse signal, for determining said time between firings as the time between successive pulses of said pulse signal, for developing a time signal having a magnitude indicative of said determined time between plug firings, for collecting a plurality of successive ones of said time signals as developed over time, for ordering said plurality of time signals in magnitude from smallest to largest, for sorting said ordered time samples into one or more bins, each bin having upper and lower boundary criteria based on a range of magnitude of time that any one of said time samples may lie within, for averaging the time value of each of the resulting one or more of said bins, whereby, if a single bin results as a result of said sorting of said ordered time samples, said fundamental time signal equals the average time value of said single bin, and for determining said fundamental time signal if a plurality of bins result from said sorting of said ordered time samples.

27. The apparatus of claim 26, wherein said signal processing means further comprises means for dividing the average time value of each of said plurality of bins by the average time value of each other one of said plurality of bins, for determining a harmonic to be a whole number result within a tolerance range as a result of said dividing, for adding, for each said determined harmonic, a weight of the corresponding one of said each of said plurality of bins to a weight of the corresponding one of said each other one of said plurality of bins, said bin weight being determined as the number of said time samples in each of said plurality of bins as a result of said sorting of said ordered time samples, and for determining the value of said fundamental time signal as the average time value of the one of said plurality of bins corresponding to the sum result of said adding having the largest value.

28. The apparatus of claim 26, wherein said signal processing means further comprises means for providing an amplitude signal indicative of the ability of said sensed spark signals to accurately indicate valid firings of the spark plugs, said amplitude signal being provided as the inverse of the number of said bins resulting from said sorting of said ordered time samples into one or more bins.

29. The apparatus of claim 28, wherein said display means comprises means for displaying visually said amplitude signal, said displayed amplitude signal being indicative of an optimum placement of said hand-held probe assembly in proximity to the spark ignition system of the vehicle under test.

30. The apparatus of claim 29, wherein said display means comprises means for displaying visually said amplitude signal in a bar graph format.

31. A method for measuring the operational rate in revolutions per minute (RPM) of an internal combustion engine having a spark ignition system including a plurality of spark plugs, the spark ignition system radiating electromagnetic energy upon spark electrical discharges, the electromagnetic energy signals being radiated corresponding to changing electrical current circulating in the conductive paths in the engine, said method comprising:

sensing the electromagnetic energy signals radiating from the engine;

generating sensed spark signals indicative of the sensed electromagnetic energy signals radiating from the engine;

developing, in response to each of said sensed spark signals, a pulse signal having pulses indicative of said sensed spark signals;

developing from said pulse signal a fundamental time signal indicative of a time between firings of the spark plugs; and determining actual engine RPM from said fundamental time signal;

said fundamental time signal step comprising the steps of:

determining from said pulse signal the time between firings of the spark plugs as the time between successive pulses of said pulse signal;

developing a time signal having a magnitude indicative of said determined time between firings of the spark plugs;

collecting a plurality of successive ones of said time signals as developed over time;

ordering said plurality of time signals in magnitude from smallest to largest;

sorting said ordered time samples into one or more bins, each bin having upper and lower boundary criteria based on a range of magnitude of time that any one of said time samples may lie within;

averaging the time value of each resulting one of said one or more of said bins;

equating said fundamental time signal to said averaged time value of a resulting single bin if, as a result of said sorting of said ordered time samples, a single bin results; and determining the value of said fundamental time signal when a plurality of bins result form said sorting of said ordered time samples.

32. The method of claim 31, further comprising the steps of:

developing a calculated engine RPM signal indicative of the determined actual engine RPM; and displaying visually the value of said calculated engine RPM signal.

33. The method of claim 31, wherein said step of developing said pulse signal in response to each of said sensed spark signals comprises the steps of:

comparing the amplitude of each of said sensed spark signals to a predetermined threshold to determine an exceedence thereof;

creating a pulse in said pulse signal for each of said sensed spark signals whose magnitude exceeds said predetermined threshold.

34. The method of claim 31, wherein said step of developing said pulse signal in response to each of said sensed spark signals comprises the step of:

developing said pulse signal with a substantially constant amplitude for the normally varying magnitude of the electromagnetic energy signals radiating from the engine as well as said sensed spark signals.

35. The method of claim 31, wherein said step of determining the value of said fundamental time signal when a plurality of said bins result from said sorting of said ordered time samples comprises the steps of:

dividing the average time value of each of said plurality of bins by the average time value of each other one of said plurality of bins;

next, determining a harmonic to be a whole number result within a tolerance range as a result of said step of dividing;

next, adding, for each said determined harmonic, a weight of the corresponding one of said each of said plurality of bins to a weight of the corresponding one of said each other one of said plurality of bins, said bin weight being determined as the number of said time samples in each of said plurality of bins as a result of said step of sorting said ordered time samples; and determining the value of said fundamental time signal as the average time value of the one of said plurality of bins corresponding to the sum result of said step of adding having the largest result.

36. The method of claim 35, further comprising the step of:

developing an amplitude signal indicative of the ability of said sensed spark signals to accurately indicate valid firings of the spark plugs.

37. The method of claim 36, wherein said step of developing said amplitude signal comprises the step of:

developing said amplitude signal as the inverse of the number of said bins resulting from said sorting of said ordered time samples into one or more bins.

38. The method of claim 37, further comprising the step of:

displaying visually said amplitude signal.

39. The method of claim 31, wherein said step of sensing the electromagnetic energy signals radiating from the engine comprises the step of:

sensing the electromagnetic energy radiating from the spark ignition system in a frequency range of from 1 megahertz (MHz) to 10 MHz.

* * * * *